US010908320B2

(12) United States Patent
Yabuta et al.

(10) Patent No.: US 10,908,320 B2
(45) Date of Patent: Feb. 2, 2021

(54) COATED GLASS SHEET AND METHOD FOR PRODUCING SAME

(71) Applicant: Nippon Sheet Glass Company, Limited, Tokyo (JP)

(72) Inventors: Takeshi Yabuta, Hyogo (JP); Toru Yamamoto, Hyogo (JP); Fumiyoshi Kondo, Kyoto (JP); Yoko Miyamoto, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 274 days.

(21) Appl. No.: 15/765,408

(22) PCT Filed: Sep. 7, 2016

(86) PCT No.: PCT/JP2016/004080
§ 371 (c)(1),
(2) Date: Apr. 2, 2018

(87) PCT Pub. No.: WO2017/056405
PCT Pub. Date: Apr. 6, 2017

(65) Prior Publication Data
US 2018/0292577 A1 Oct. 11, 2018

(30) Foreign Application Priority Data

Oct. 1, 2015 (JP) ................................. 2015-196052
Nov. 30, 2015 (JP) ................................. 2015-233102

(51) Int. Cl.
*B32B 17/06* (2006.01)
*G02B 1/115* (2015.01)
(Continued)

(52) U.S. Cl.
CPC .......... *G02B 1/115* (2013.01); *C03C 17/3411* (2013.01); *C23C 18/122* (2013.01);
(Continued)

(58) Field of Classification Search
CPC ..... Y10T 428/24942; Y10T 428/12549; Y10T 428/26; Y10T 428/12493;
(Continued)

(56) References Cited

U.S. PATENT DOCUMENTS 5,605,609 A * 2/1997 Ando ................ B32B 17/10174
204/192.23
8,098,432 B2 * 1/2012 Ishizawa .................. G02B 1/11
359/581

(Continued)

FOREIGN PATENT DOCUMENTS

JP 2006215542 A 8/2006
JP 2009237551 A 10/2009

(Continued)

OTHER PUBLICATIONS

Morito JP2014214063 English machine translation, 2014.*
(Continued)

*Primary Examiner* — Lauren R Colgan
(74) *Attorney, Agent, or Firm* — Hamre, Schumann, Mueller & Larson, P.C.

(57) ABSTRACT

The coated glass sheet of the present invention includes: a glass sheet; and a coating film provided on at least one principal surface of the glass sheet. The coating film includes a dense layer and a porous layer. The dense layer is positioned between the porous layer and the glass sheet.

36 Claims, 1 Drawing Sheet

(51) Int. Cl.
  *G02B 1/11* (2015.01)
  *C23C 18/12* (2006.01)
  *G02B 1/113* (2015.01)
  *C03C 17/34* (2006.01)
  *G02B 5/02* (2006.01)
  *G02B 1/18* (2015.01)
  *G02B 1/118* (2015.01)

(52) U.S. Cl.
  CPC ........ *C23C 18/127* (2013.01); *C23C 18/1212* (2013.01); *C23C 18/1216* (2013.01); *C23C 18/1254* (2013.01); *C23C 18/1283* (2013.01); *G02B 1/11* (2013.01); *G02B 1/113* (2013.01); *G02B 5/0247* (2013.01); *C03C 2217/425* (2013.01); *C03C 2217/732* (2013.01); *C03C 2217/734* (2013.01); *G02B 1/118* (2013.01); *G02B 1/18* (2015.01); *G02B 2207/107* (2013.01)

(58) Field of Classification Search
  CPC ....... Y10T 428/24612; Y10T 428/2982; Y10T 428/31525; Y10T 428/31601; C23C 14/08; C23C 18/1212; C23C 18/1216; C23C 18/1254; C03C 17/3411; B32B 2255/28; G02B 1/115; G02B 2207/107
  USPC ............... 428/426, 428, 432, 688, 701, 702
  See application file for complete search history.

(56) References Cited

U.S. PATENT DOCUMENTS

| | | | |
|---|---|---|---|
| 2006/0154044 A1* | 7/2006 | Yamada | C03C 17/34 428/312.2 |
| 2009/0161219 A1 | 6/2009 | Ishizawa et al. | |
| 2009/0220774 A1* | 9/2009 | Imai | C23C 18/1212 428/331 |
| 2010/0027123 A1* | 2/2010 | Imai | G02B 1/115 359/586 |
| 2010/0136319 A1* | 6/2010 | Imai | G02B 1/113 428/315.5 |
| 2012/0244318 A1* | 9/2012 | Koyo | G02B 1/113 428/149 |
| 2013/0202895 A1* | 8/2013 | Arfsten | C08G 77/58 428/446 |
| 2014/0120341 A1* | 5/2014 | Kharchenko | C23C 14/0057 428/312.6 |
| 2015/0177425 A1* | 6/2015 | Kondo | H01L 31/042 428/149 |
| 2018/0050956 A1* | 2/2018 | Kondo | H01L 31/048 |

FOREIGN PATENT DOCUMENTS

| | | |
|---|---|---|
| JP | 2010038948 A | 2/2010 |
| JP | 2014032248 A | 2/2014 |
| JP | 2014214063 A | 11/2014 |
| JP | 2015075707 A | 4/2015 |
| WO | 2008001675 A1 | 1/2008 |
| WO | WO2014020836 * | 2/2014 |

OTHER PUBLICATIONS

International Search Report issued for International Patent Application No. PCT/JP2016/004080, dated Dec. 13, 2016, 5 pages including English translation.

* cited by examiner

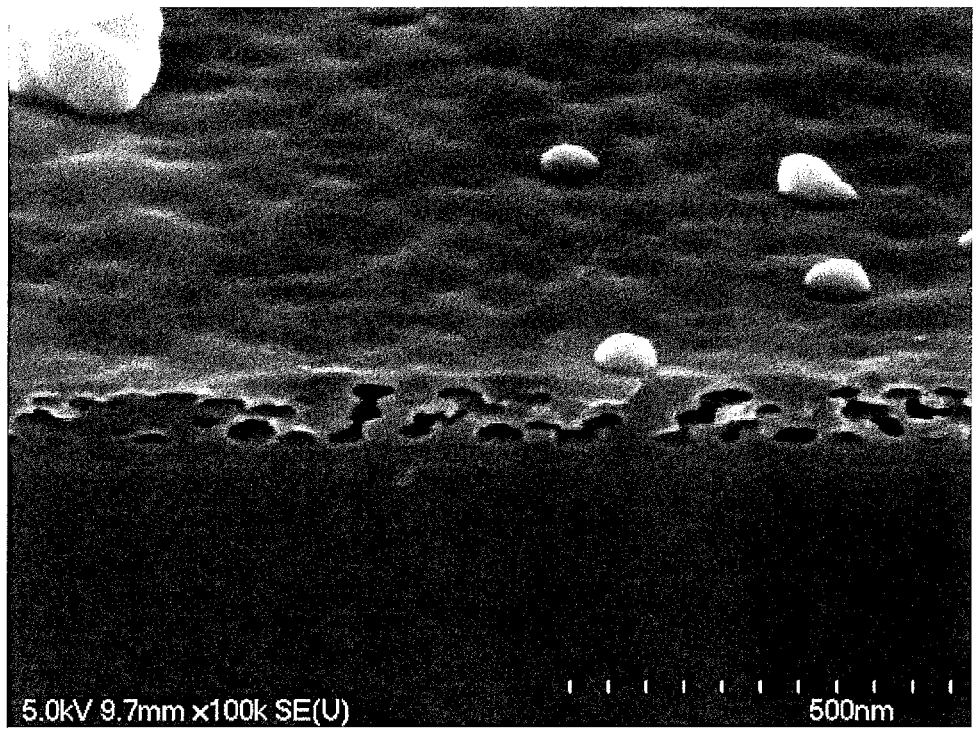

COATED GLASS SHEET AND METHOD FOR PRODUCING SAME

TECHNICAL FIELD

The present invention relates to a coated glass sheet and a method for producing the same.

BACKGROUND ART

For the purpose of improving the function of a glass or ceramic substrate in its intended use, a functional coating film is formed on the surface of the substrate. For example, a low-reflection coating film is formed on the surface of a substrate to increase the amount of light to be transmitted through the substrate or prevent glare caused by reflection. Glass sheets provided with a low-reflection coating film are used, for example, in vehicle panes, show-windows, and photoelectric conversion devices. In a thin-film solar cell, which is a type of photoelectric conversion device, an underlayer film, a transparent conductive film, a photoelectric conversion layer made of amorphous silicon or the like, and a back-side thin-film electrode are stacked in this order on one principal surface of a glass substrate, and a low-reflection coating film is formed on the other principal surface of the glass sheet opposite to the one principal surface. In a so-called crystalline solar cell, which is another type of photoelectric conversion device, a cover glass is disposed on the sunlight-incident side, and a low-reflection coating film is formed on the surface of the cover glass. In a glass sheet for use in a solar cell, a low-reflection coating film is formed on the sunlight-incident surface of the glass sheet as described above. This allows more sunlight to reach the photoelectric conversion layer or solar cell element, thus increasing the amount of electricity to be generated.

Most commonly used low-reflection coating films are dielectric films formed by a process such as vacuum deposition, sputtering, or chemical vapor deposition (CVD). In some cases, a fine particle-containing film containing fine particles such as fine silica particles is used as a low-reflection coating film. Such a fine particle-containing film is formed by applying a coating liquid containing fine particles onto a transparent substrate by a technique such as dipping, flow coating, or spraying.

For example, JP 2014-032248 A (Patent Literature 1) discloses a cover glass for photoelectric conversion devices, the cover glass including: a glass sheet having surface asperities; and an antireflective film formed on the glass sheet and containing fine particles and a binder, the fine silica particles being uniformly arranged in a single layer on peak portions of the surface asperities in such a manner that a filling factor falls within a predetermined range. The antireflective film of this cover glass can produce an increase of at least 2.37% in average light transmittance in the wavelength range of 380 to 1100 nm.

CITATION LIST

Patent Literature

Patent Literature 1: JP 2014-032248 A

SUMMARY OF INVENTION

Technical Problem

In some cases, conventional coated glass sheets provided with a porous low-reflection coating film such as a fine particle-containing film, for example, have problems in that the coating film has insufficient durability and thus has reduced functions, and furthermore that the water having penetrated into the coating film from outside of the coating film deteriorates the surface of the glass sheet.

In view of such circumstances, the present invention aims to obtain a coated glass sheet including a glass sheet and a porous low-reflection coating film formed on a principal surface of the glass sheet, the coating film being enhanced to allow the coated glass sheet to have excellent durability.

Solution to Problem

The present invention provides a coated glass sheet including:
a glass sheet; and
a coating film provided on at least one principal surface of the glass sheet, wherein
the coating film includes a dense layer and a porous layer, and the dense layer is positioned between the porous layer and the glass sheet.

Advantageous Effects of Invention

In the coated glass sheet of the present invention, the coating film includes a dense layer, and the dense layer is positioned between a porous layer and a glass sheet. The presence of such a dense layer allows the coating film to have increased durability and maintain its functions for a long period of time. Furthermore, the presence of the dense layer can reduce water to penetrate into the coating film from outside of the coating film, and thus can also suppress the deterioration of the surface of the glass sheet. As a result, a coated glass sheet with high durability can be provided.

BRIEF DESCRIPTION OF DRAWING

FIG. 1 shows a result of observation on a coating film of a coated glass sheet of Example 9 with a field emission scanning electron microscope (FE-SEM).

DESCRIPTION OF EMBODIMENTS

Embodiment 1

An embodiment of the coated glass sheet of the present invention will be described.

The coated glass sheet according to the present embodiment includes a glass sheet and a coating film provided on at least one principal surface of the glass sheet.

The glass sheet is not limited to a particular one. A glass sheet having a microscopically smooth surface is preferred to allow the coating film provided on the principal surface of the glass sheet to have a smooth surface. For example, the glass sheet may be a float glass sheet having a principal surface having such a smoothness that the arithmetic average roughness Ra is, for example, 1 nm or less and preferably 0.5 nm or less. The glass sheet may be a float glass sheet having a coating different from the coating film as defined in the present embodiment, the coating including a transparent conductive film and being formed on a principal surface of the glass sheet opposite to the principal surface on which the coating film of the present embodiment is to be formed. The arithmetic average roughness Ra as described herein corresponds to that as specified in JIS B 0601-1994.

The glass sheet may be a figured glass sheet with a surface having macroscopic asperities which are large enough to be observed with the naked eye. The macroscopic asperities as described herein refer to asperities for which the mean spacing Sm is on the order of millimeters as determined by setting an evaluation length on the order of centimeters in the roughness profile. In the present embodiment, the mean spacing Sm of the asperities on the surface of the figured glass sheet is preferably 0.3 mm or more, more preferably 0.4 mm or more, and even more preferably 0.45 mm or more, and is preferably 2.5 mm or less, more preferably 2.1 mm or less, even more preferably 2.0 mm or less, and particularly preferably 1.5 mm or less. The mean spacing Sm as described herein refers to an average of lengths of peak-valley periods in the roughness profile which are determined based on points at which the roughness profile intersects the mean line. It is further preferable that the surface asperities of the figured glass sheet have a maximum height Ry of 0.5 µm to 10 µm, in particular 1 µm to 8 µm, as well as having a mean spacing Sm within the above range. The mean spacing Sm and maximum height Ry as described herein correspond to those as specified in JIS (Japanese Industrial Standards) B 0601-1994. Even such a figured glass sheet can have an arithmetic average roughness Ra of several nanometers or less, in particular 1 nm or less, when the figured glass sheet is microscopically examined (such as in surface roughness measurement by atomic force microscope (AFM) observation in which the evaluation length in the roughness profile is several hundreds of nanometers). Thus, the figured glass sheet can be considered a glass sheet having a microscopically smooth surface and can be suitably used as a glass sheet in the coated glass sheet of the present embodiment.

It is preferable that the surface asperities of the figured glass sheet have an arithmetic average roughness Ra of 0.3 µm to 5.0 µm, particularly 0.4 µm to 2.0 µm, more particularly 0.5 µm to 1.2 µm, as well as having a mean spacing Sm and a maximum height Ry within the above ranges. The figured glass sheet as described above exhibits a sufficient anti-glare effect attributed to its surface asperities. However, when the roughness parameters are excessively large, reflection color is likely to become uneven in the surface.

The glass sheet used may have a composition similar to those of common figured glass sheets or architectural glass sheets. The glass sheet is preferably as free of coloring components as possible. In the glass sheet, the content of iron oxide, which is a typical coloring component, is preferably 0.06 mass % or less and particularly preferably 0.02 mass % or less in terms of $Fe_2O_3$ content.

The coating film according to the present embodiment will next be described.

The coating film includes a dense layer and a porous layer. The dense layer is positioned between the porous layer and the glass sheet. In other words, the dense layer is disposed on the glass sheet side with respect to the porous layer in the coating film. The coating film according to the present embodiment is only required to satisfy the above-described positional relationship between the dense layer and the porous layer, and may further include another layer besides the dense layer and the porous layer. Hereinbelow, a case where the coating film consists of the dense layer and the porous layer (a case of a double-layer structure) will be described as an example.

The dense layer is a layer substantially free of voids. Specifically, the dense layer preferably has no pores with a diameter of 10 nm or more in a field of view when a cross-section of the dense layer is observed with an SEM. The dense layer preferably has a smooth surface with an arithmetic average roughness Ra of 5 nm or less.

The dense layer may have, for example, a physical thickness of 10 to 40 nm, 10 to 20 nm, or 20 to 40 nm. The presence or absence of the dense layer does not affect the optical properties of the coating significantly. The dense layer preferably has a refractive index of 1.4 to 2.0, more preferably 1.55 or less, and even more preferably 1.50 or less.

The dense layer can be an arbitrary one as long as it is free of voids as described above. The dense layer is preferably formed of a transparent inorganic amorphous material, and is more preferably a continuous layer containing an oxide of silicon (silica in particular) as a main component. Saying that the dense layer contains an oxide of silicon as a main component means that the content of the oxide of silicon in the dense layer is 50 mass % or more.

The oxide of silicon is an amorphous material with a low refractive index. In a case where a silicon oxide based material is used for the below-described porous layer, for example, the dense layer has improved durability as a low-reflection coating because the oxide of silicon has high affinity for the silicon oxide material despite of the fact that the thickness of the dense layer is so small as not to affect the optical properties.

The dense layer preferably contains a metal compound other than the oxide of silicon to achieve an effect such as a further improvement in durability. For example, the dense layer may further contain, besides the oxide of silicon, at least one oxide selected from the group consisting of an oxide of aluminum, an oxide of zirconium, and an oxide of titanium. In the dense layer, the content of the oxide of aluminum is preferably, in terms of $Al_2O_3$ content, 10 mass % or less relative to the silica contained in the dense layer. In the dense layer, the content of the oxide of zirconium is preferably, in terms of $ZrO_2$ content, 10 mass % or less relative to the silica contained in the dense layer. In the dense layer, the content of the oxide of titanium is preferably, in terms of $TiO_2$ content, 10 mass % or less relative to the silica contained in the dense layer.

As the source of the dense layer containing the oxide of silicon as a main component, there can be used a hydrolyzable metal compound typified by a silicon alkoxide. Examples of the silicon alkoxide include tetramethoxysilane, tetraethoxysilane, and tetraisopropoxysilane. Such a hydrolyzable metal compound can be formed into the dense layer by a so-called sol-gel process in which the hydrolyzable metal compound is hydrolyzed and polycondensed.

It is preferable for the dense layer to be substantially free of an organic compound. Saying that the dense layer is substantially free of an organic compound means that the content of the organic compound is less than 5 mass % in the dense layer.

The porous layer includes: isolated closed pores present within the porous layer; and a matrix. From another standpoint, the closed pores in the porous layer can be said to be pores that are isolated within the film by being surrounded by the matrix. Air is believed to be present within the closed pores. The coating film has a reduced effective refractive index due to including such closed pores therein and can thus exert a low-reflection effect. That is, the coating film according to the present embodiment can function as a low-reflection coating film that can exhibit superior low-reflection properties. Thus, the coated glass sheet of the present embodiment can exhibit a transmittance gain as high as 2.5% or more even when the surface of the coated glass sheet has no asperities. The transmittance gain as defined herein refers to a value calculated by subtracting an average transmittance of the glass sheet as determined by applying light having wavelengths of 380 to 1100 nm to the glass sheet in the absence of the coating film on the surface of the glass sheet (before the coating film is provided on the surface of the glass sheet) from an average transmittance of the coated glass sheet as determined by applying light having the wavelengths to the coated glass sheet from a side on which the coating film lies. The transmittance gain can be increased to 2.6% or more or even to 2.9% or more by adjusting the shape and size of the closed pores and the porosity of the coating film to appropriate ranges specified in the following description.

The coated glass sheet of the present embodiment can exhibit a transmittance gain as described above and thus have superior light transmission properties.

The porous layer is substantially free of pores (open pores) that are open at a surface of the porous layer. Saying that the porous layer is substantially free of open pores means that the number of open pores per unit area of the surface of the porous layer is less than 0.2 pores/$\mu m^2$, preferably less than 0.16 pores/$\mu m^2$, and more preferably less than 0.01 pores/$\mu m^2$. It is preferable for the porous layer to have no open pores. The number of open pores per unit area is determined by observing the surface of the porous layer using an SEM with a 2.5-$\mu$m-square field of view, counting the number of open pores, and dividing the counted number by the area of the field of view. Saying that the porous layer has no open pores means that no open pores are found when three different regions of the surface of one sample of the porous layer are observed with a 2.5-$\mu$m-square field of view. The open pores described herein refer to pores that are found by SEM observation of the surface of the porous layer and that have an opening with a diameter of 5 nm or more. When the number per unit area of pores open at the surface of the coating film is in the above range, matter such as a resin having adhered to the surface can easily be removed. It is therefore possible to prevent the yield of the production process from decreasing due to the presence of adhering matter.

The closed pores may be approximately elliptical when viewed in a cross-section along a thickness direction of the porous layer. For example, the closed pores, when viewed in the above cross-section, include first closed pores that are approximately elliptical isolated pores and second closed pores each formed of two or more approximately elliptical pores connected to each other.

The first closed pores and the approximately elliptical pores forming the second closed pores each have, for example, a major axis with a length of 30 to 80 nm and a minor axis with a length of 20 to 30 nm. The length of the major axis refers to the largest diameter of the approximately elliptical pore observed in the above cross-section, and the length of the minor axis refers to the diameter of the pore in a direction orthogonal to the major axis. The length of the major axis may be 20 to 80 nm or 30 to 70 nm. The length of the minor axis may be 10 to 40 nm or 15 to 30 nm.

The first closed pores and the approximately elliptical pores forming the second closed pores may be arranged so that their major axes extend substantially along the surface of the coating film. In this case, the three-dimensional shape of the first closed pores and the three-dimensional shape of the approximately elliptical pores forming the second closed pores can be considered an oblate, approximately spheroidal shape whose axis of rotation extends along the thickness direction of the porous layer.

As described above, the porous layer has a porous structure including closed pores therein. The higher the porosity of the porous layer is, the lower the apparent refractive index of the coating film is, and the more reduced the reflectance of the coated glass sheet is. However, having an excessively high porosity leads to reduction in the durability of the coating film. For these reasons, the porosity of the porous layer is preferably 10 to 40% and more preferably 15 to 30%.

The porous layer has a thickness of 50 to 300 nm, and preferably 100 to 250 nm, for example.

The porous layer may include granules present in the surface of the porous layer. However, if too many granules are present in the surface of the porous layer, the light transmission properties of the coated glass sheet may be deteriorated or the ease of removal of matter adhering to the coated glass sheet may be reduced. Thus, the number of granules of 20 to 100 nm diameter found in the surface of the porous layer by SEM observation of the surface of the porous layer is preferably 100 granules/$\mu m^2$ or less, more preferably 75 granules/$\mu m^2$ or less, and particularly preferably 50 granules/$\mu m^2$ or less.

In the surface of the porous layer, a region other than the openings of the open pores (and other than the above granules when the granules are present in the surface) has such a surface roughness that the arithmetic average roughness Ra is, for example, 3 nm or less as determined over an evaluation length of 300 nm.

As described above, the porous layer includes a matrix. This matrix can contain a metal oxide containing silicon, titanium, aluminum, zirconium, and/or tantalum. The matrix preferably contains an oxide of silicon (silica in particular) as a main component. The main component of the matrix, as defined herein, refers to a component whose content is highest in the matrix.

Silica has high affinity for a glass sheet containing silicon oxide as a main component, and thus the use of silica can increase the durability of the coating film. Additionally, silica has a low refractive index, and thus the use of silica can further decrease the apparent refractive index of the porous layer, providing a further increase in transmittance gain. As described below, a metal compound other than an oxide of silicon may be incorporated in the matrix to achieve an effect such as a further improvement in durability.

As the source of the matrix (matrix raw material), there can be used a hydrolyzable metal compound typified by a silicon alkoxide. Such a hydrolyzable metal compound can be formed into the matrix by a so-called sol-gel process in which the hydrolyzable metal compound is hydrolyzed and polycondensed.

When the matrix of the porous layer contains silica, a hydrolyzable silicon compound is used as the matrix raw material. In this case, the silica forming the matrix is derived from a product of hydrolysis and condensation of the hydrolyzable silicon compound.

The hydrolyzable silicon compound used is, for example, a silicon alkoxide. In the present embodiment, the silicon alkoxide preferably includes a silicon alkoxide having one or two organic groups directly bonded to the silicon atom and more preferably consists of a silicon alkoxide having one or two organic groups directly bonded to the silicon atom, because in these cases a coating film having the structural characteristics as described above can more easily be obtained. The organic group(s) is (are) preferably hydrophobic. In other words, a silicon alkoxide having one or two non-hydrolyzable functional groups is suitably used. This is because, as described below, a coating film having a porous structure including closed pores therein can be effectively produced when the hydrolyzable silicon compound consists of a silicon alkoxide having one or two organic groups directly bonded to the silicon atom. Examples of the organic group(s) directly bonded to the silicon atom include a linear alkyl group having 1 to 5 carbon atoms. Specific examples of the silicon alkoxide include methyltrimethoxysilane, dimethyldimethoxysilane, methyltriethoxysilane, and dimethyldiethoxysilane. Furthermore, some of these silicon alkoxides having one or two organic groups directly bonded to the silicon atom can include ones in which the organic group(s) is (are) crosslinkable. The organic group(s) is (are) preferably an organic group including an epoxy group and a vinyl group. An example of such a silicon alkoxide having crosslinkable organic group(s) directly bonded to the silicon atom is 3-glycidoxypropyltrimetoxysilane (GPTMS). In this case, the product of hydrolysis and condensation of the hydrolyzable silicon compound contains an organic group derived from a non-hydrolyzable functional group.

The matrix of the porous layer preferably contains no organic group, although it is acceptable for the matrix to contain an organic group. This is because the matrix has higher durability and wear resistance when containing no organic group.

When the main component of the matrix of the porous layer is silica, the matrix may further contain an oxide of at least one element selected from the group consisting of aluminum, titanium, and zirconium. The matrix further containing such an oxide provides an improvement in the durability of the coating film. When the matrix of the coating film contains such a metal oxide, it is preferable to add a water-soluble inorganic compound such as a metal chloride or oxychloride to the matrix raw material.

The matrix of the porous layer preferably contains 90 to 100 mass % of silica and more preferably contains 94 to 100 mass % of silica. When the matrix of the coating film contains an oxide of at least one element selected from the group consisting of aluminum, titanium, and zirconium, the oxide is contained in the coating film preferably in an amount of 2 to 7 mass %, more preferably in an amount of 3 to 6 mass %.

The porous layer may further include, for example, fine solid particles in addition to the closed pores, open pores, and matrix. When the porous layer includes fine solid particles, the porous layer has improved durability. The fine solid particles are bound by the matrix. The fine solid particles have, for example, an average particle diameter of 10 to 100 nm. The fine solid particles may be approximately spherical primary particles having a particle diameter within the above range or may be secondary particles having a particle diameter within the above range and composed of agglomerates of primary particles having a smaller particle diameter. A greater average particle diameter is more preferred in terms of improvement in durability of the porous layer. However, it is not preferable that the average particle diameter be excessively large because in this case the surface roughness of the porous layer is so increased that removal of matter adhering to the coating film becomes difficult when, for example, the porous layer is the outermost layer of the coating film. The fine solid particles used can be, for example, fine silica particles. The average particle diameter of the fine solid particles is determined by observing the cross-section of the porous layer with an SEM. Specifically, 50 particles the entirety of each of which is observable are randomly selected, the largest and smallest diameters of each particle are measured, the average of the largest and smallest diameters is determined as the particle diameter of the particle, and the average of the particle diameters of the 50 particles is determined as the "average particle diameter".

The closed pores included in the porous layer and the open pores which may be included in the porous layer can be formed by any appropriate method. The closed pores and the open pores are preferably derived from fine particles that are contained as a pore forming agent in a coating liquid for forming the porous layer and that are lost by heat treatment at a temperature equal to or higher than a predetermined temperature. Such fine particles are used, so to speak, as a "mold", and are finally lost by heat treatment. The spaces originally occupied by the fine particles remain in the form of pores in the coating film. The pores thus formed are the closed pores or open pores. Fine particles that can be used as a pore forming agent are those which are lost by evaporation, thermal decomposition, or burning in heat treatment performed, for example, at 400° C. or higher or preferably at 600° C. or higher.

The fine particles used as a pore forming agent are, for example, fine organic polymer particles. The fine organic polymer particles preferably have a hydrophilic group on their surfaces. Examples of the hydrophilic group include, but are not limited to, a hydroxy group, a carbonyl group, and a carboxyl group. The fine organic polymer particles preferred are less prone to separation in the coating liquid and are suitable for effective formation of a coating film having a porous structure including closed pores therein. The average particle diameter of the fine organic polymer particles is preferably 10 to 200 nm, more preferably 20 to 150 nm, and particularly preferably 30 to 100 nm. The average particle diameter of the fine organic polymer particles is determined by light scattering particle size distribution analysis.

The coated glass sheet of the present embodiment can be produced, for example, by a production method including the step of forming a coating film on one principal surface of a glass sheet, wherein the step includes:

(A) forming a wet film for dense layer formation using a coating liquid for dense layer formation, and drying the wet film for dense layer formation, (B) forming a wet film for porous layer formation using a coating liquid for porous layer formation containing a matrix raw material and a pore forming agent, and drying the wet film for porous layer formation, (C) calcining the dried film for dense layer formation, and (D) calcining the dried film for porous layer formation.

The coating liquid for dense layer formation contains the source that provides a material for forming the dense layer. The material for forming the dense layer is as described above. When the dense layer is formed of a material containing an oxide of silicon (silica in particular) as a main component, for example, a hydrolyzable metal compound typified by a silicon alkoxide can be used as the source as described above. Examples of the silicon alkoxide include tetramethoxysilane, tetraethoxysilane, and tetraisopropoxysilane. Such a hydrolyzable metal compound can be formed into the dense layer by a so-called sol-gel process in which the hydrolyzable metal compound is hydrolyzed and polycondensed. When the dense layer further contains, besides the oxide of silicon, an oxide of at least one element selected from the group consisting of aluminum, zirconium and titanium, the sources of these oxides are added to the coating liquid for dense layer formation. For example, when the dense layer contains aluminum oxide ($Al_2O_3$), aluminum halide (aluminum chloride, for example) can be used as the source.

The pore forming agent contained in the coating liquid for porous layer formation is as described above. The matrix raw material is a hydrolyzable metal compound that can be formed into a matrix by a so-called sol-gel process in which the hydrolyzable metal compound is hydrolyzed and polycondensed. The details of the matrix raw material are as described above.

When the coating liquid for porous layer formation contains a hydrolyzable silicon compound as the matrix raw material and contains, as the pore forming agent, fine particulates (fine organic polymer particles, for example) that are lost by heat treatment at a temperature equal to or higher than a predetermined temperature, the content of the fine particles is preferably 12 to 38 parts by mass, more preferably 15 to 35 parts by mass, and particularly preferably 17 to 25 parts by mass, relative to 100 parts by mass of a product of hydrolysis and condensation of the hydrolyzable silicon compound. When the coating liquid for porous layer formation contains the fine organic polymer particles in the above proportion, it is easy to form closed pores within the coating film so that a transmittance gain of 2.5% or more can be achieved.

When the hydrolyzable silicon compound contained in the matrix raw material is a hydrolyzable silicon compound (a crosslinkable hydrolyzable silicon compound) having one or two crosslinkable organic groups directly bonded to the silicon atom, the content of the crosslinkable hydrolyzable silicon compound in the matrix raw material is preferably 0.1 to 5 mass %, and more preferably 0.2 to 2.5 mass %. The content described herein refers to the percentage of the mass of a product of hydrolysis and condensation of the crosslinkable hydrolyzable silicon compound relative to the total mass of the product of hydrolysis and condensation of the hydrolyzable silicon compound used as the matrix raw material.

From another standpoint, in the coating liquid for porous layer formation, the mass of the product of hydrolysis and condensation of the crosslinkable hydrolyzable silicon compound is preferably 0.2 to 10 parts by mass, and more preferably 1 to 6 parts by mass, relative to 100 parts by mass of the pore forming agent. When the coating liquid for porous layer formation contains the crosslinkable hydrolyzable silicon compound in such a proportion, it is easy to form closed pores within the coating film, and the open pores and granules in the surface can be reduced more effectively. Thus, matter such as a resin having adhered to the surface can easily be removed.

The coating liquid for dense layer formation and the coating liquid for porous layer formation may contain another component such as a hydrolysis catalyst, leveling agent, surfactant, and solvent, if desired, in addition to the source of the material for forming the dense layer, and the matrix raw material and the pore forming agent for forming the porous layer, respectively. The hydrolysis catalyst is used to promote the hydrolysis of the hydrolyzable metal compound. The leveling agent and surfactant are used to improve the leveling of the wet film formed by application of the coating liquid, improve the wetting properties of the coating liquid to a substrate such as the glass sheet, and reduce the unevenness of application of the coating liquid.

The solids concentration of the coating liquid for dense layer formation and that of the coating liquid for porous layer formation are not particularly limited. The coating liquids each can be freely diluted with a solvent to have an appropriate solids concentration that leads to prevention of uneven application of the coating liquids and prevention of occurrence of defects such as cracks during the drying and calcination steps and that allows the coating film to have a thickness within a given range.

When the coating liquid for dense layer formation contains a hydrolyzable metal compound as the matrix raw material, a hydrolysate of the hydrolyzable metal compound is contained in the coating liquid. Thus, the hydrolyzable metal compound may be hydrolyzed in the coexistence of the pore forming agent to prepare the coating liquid for dense layer formation containing a hydrolysate. Alternatively, a hydrolysate solution may be prepared first by hydrolyzing the hydrolyzable metal compound and may then be mixed with the pore forming agent to prepare the coating liquid for dense layer formation.

An example of the method for producing the coated glass sheet in which the coating film has a double-layer structure composed of the dense layer and the porous layer will be described. In this method, the above-mentioned two coating liquids are applied onto the surface of the glass sheet in order. First, the coating liquid for dense layer formation is applied to a predetermined thickness on one principal surface of the glass sheet to form the wet film for dense layer formation. After the wet film for dense layer formation has at least been dried and has lost its liquidity, that is, the wet film has turned into a dried film, the coating liquid for porous layer formation is provided on the dried film to form the wet film for porous layer formation and then dried. After that, the dried film for dense layer formation and the dried film for porous layer formation are calcined at once to obtain the dense layer and the porous layer. That is, in this example of the production method, the above-described steps (A) to (D) are executed in the order of (A)→(B)→(C), (D) (the steps (C) and (D) are executed simultaneously) in the step of forming the coating film.

As another example, there can be used a method in which the wet film for dense layer formation is dried and then calcined to form the dense layer, and thereafter the coating liquid for porous layer formation is applied onto the dense layer to form the wet film for porous layer formation, and the wet film for porous layer formation is dried and then calcined to form the porous layer. That is, in this example of the production method, the steps (A) to (D) are executed in the order of (A)→(C)→(B)→(D) in the step of forming the coating film.

As the technique for applying these coating liquids, a known appropriate technique such as spin coating, roll coating, bar coating, dip coating, and spray coating can be used. The spin coating is preferred because it makes the film thickness uniform. The roll coating and the bar coating are preferred because they can be easily used for large-sized glass sheets, resulting in excellent productivity.

Next, an example of the mechanism to form the porous structure including the closed pores and having no open pores in the formation of the porous layer using the coating liquid for porous layer formation will be described. Hereinbelow, a case where the coating liquid for porous layer formation contains the hydrolyzable metal compound as the matrix raw material will be described as an example. When the hydrolyzable metal compound is composed of a hydrolyzable silicon compound having one or two hydrophobic organic groups directly bonded to the silicon atom and the fine organic polymer particles contained as the pore forming agent have a hydrophilic group on their surfaces, the hydrolyzable silicon compound and the fine organic polymer particles are rearranged in the wet film for porous layer formation, and the structure resulting from the rearrangement is fixed by the drying. In this rearrangement, the hydrolysate, which has a hydrophobic group, moves to the vicinity of the side of the wet film for porous layer formation remote from the glass sheet which is highly hydrophilic (namely, the vicinity of the free surface of the wet film for porous layer formation) and forms a smooth surface due to surface tension. By contrast, the fine organic polymer particles, which have a hydrophilic group, have a tendency to move toward the surface of the glass sheet and rarely protrude from the free surface of the wet film for porous layer formation. Thus, a porous structure free of open pores can be effectively formed. Furthermore, when the hydrolyzable metal compound is composed of the hydrolyzable silicon compound having one or two hydrophobic organic groups directly bonded to the silicon atom and the above-specified amount of the crosslinkable hydrolyzable silicon compound, a hydrolysate of the crosslinkable hydrolyzable silicon compound serves to crosslink the surfaces of the fine organic polymer particles to the surface of the glass sheet in the above-mentioned rearrangement in the wet film for porous layer formation. Thereby, the fine organic polymer particles further move toward the surface of the glass sheet and are prevented more effectively from protruding from the free surface of the wet film for porous layer formation. The drying step causes evaporation of the solvent from the wet film for porous layer formation and also induces condensation of the hydrolysate. The temperature and time for drying of the wet film for porous layer formation are not particularly limited. For example, the wet film for porous layer formation may be placed in a heating furnace set at 300 to 400° C. for 20 to 120 seconds. In this case, the surface temperature of the film reaches 100 to 150° C. It is believed that most of the pore forming agent remain without being lost after this drying step.

The dried film obtained by the drying step is subsequently calcined. This calcination step causes the pore forming agent to be lost by evaporation, thermal decomposition, or burning, resulting in formation of pores. The calcination temperature and calcination time are not particularly limited. An example of the calcination is calcination at 400 to 500° C. for 1 to 5 minutes. Another example is calcination at 600° C. or higher for 1 minute or more. In the former example of calcination, the pore forming agent is lost, while most of the organic groups contained in the matrix remain without being lost. In the latter example of calcination, both the pore forming agent and the organic groups of the matrix are lost, so that the resulting matrix contains no organic group and that the coating film has high durability and wear resistance. Preferred examples of the calcination conditions include the heating conditions employed in thermal tempering of commercially-available soda-lime glass sheets. For example, the dried film may be placed in a heating furnace set at 640 to 780° C. for 1 to 3 minutes. In this case, the surface temperature of the dried film reaches 630 to 690° C. The reason why the first closed pores and the pores forming the second closed pores have an approximately elliptical shape as described above is believed to be that the dried film shrinks in its thickness direction in the calcination step and the already-formed pores correspondingly shrinks in the thickness direction of the dried film.

With the method described above, the coated glass sheet of the present embodiment can be produced.

Embodiment 2

Another embodiment of the coated glass sheet of the present invention will be described. The coated glass sheet according to the present embodiment has a structure identical to that of the coated glass sheet according to Embodiment 1, except that the coated glass sheet according to the present embodiment further includes a contact angle-increasing film disposed on the coating film. Therefore, only the contact angle-increasing film will be described in the present embodiment.

The contact angle-increasing film is a film on which liquids form a large contact angle when adhering to the film. The water repellency and oil repellency of the surface of the coated glass sheet are higher in the presence of the contact angle-increasing film on the coating film than in the absence of the contact angle-increasing film. Thus, the coated glass sheet of the present embodiment has good antifouling properties; for example, fouling matter having adhered to the surface of the sheet during processing can easily be removed. This can eliminate the problem of appearance defect caused by adhesion of fouling matter, thus making it possible to increase the yield of the production process. To be more specific, in some cases where, for example, a glass sheet with a low-reflection coating film is used in a photoelectric conversion device, a photoelectric conversion element is inserted between the glass sheet with the low-reflection coating film and another sheet-shaped material and is sealed using an interlayer made of thermoplastic resin to form a laminated glass structure. This laminated glass structure effectively protects the photoelectric conversion element from the external environment, thus improving the durability and weather resistance of the photoelectric conversion element. In this laminated glass structure, the coating film is disposed on an outer side, namely on the side not in contact with the interlayer. However, the thermoplastic resin used for forming the interlayer may accidentally adhere to the coating film during the process of forming the laminated glass structure. The glass sheet has a region with the thermoplastic resin accidentally adhering thereto in this way and a region with no thermoplastic resin adhering thereto, and can be evaluated as having an appearance defect due to the difference in appearance between these regions. The adhering thermoplastic resin penetrates so deep into the porous layer of the coating film that the adhering thermoplastic resin is very difficult to remove even if an attempt is made to remove the resin. In consequence, the yield of the production process is unfortunately decreased because of the appearance defect. However, in the coated glass sheet of the present embodiment, the contact angle-increasing film is provided and thus no contamination such as the thermoplastic resin having adhered to the surface penetrates into the coating film, resulting in easy removal of the matter which has accidentally adhered.

The material of the contact angle-increasing film is not particularly limited, since the contact angle-increasing film is only required to increase the contact angle of liquids on the surface of the coating film. For example, a hydrolysate of a hydrolyzable silicon compound having a hydrophobic group directly bonded to the silicon atom is suitably used. In the compound, one or two hydrophobic groups are preferably bonded to the silicon atom, and the hydrolyzable group is preferably an alkoxy group, an acetone group, an alkenyloxy group, an amino group, or a halogen group. The hydrophobic group(s) is (are) preferably an alkyl group, a fluoroalkyl group, or an alkenyl group, and the hydrophobic group(s) preferably has (have) 1 to 30 carbon atoms, more preferably 1 to 6 carbon atoms. Specifically, the hydrophobic group(s) is (are) preferably a methyl group, an ethyl group, or a vinyl group, and the hydrolyzable group is preferably a methoxy group or an ethoxy group. Another example of the material of the contact angle-increasing film is a commercially-available fluorinated surface antifouling agent, examples of which include a fluoroalkyl-containing silane compound and a perfluoropolyether-containing silane compound.

The thickness of the contact angle-increasing film is preferably selected according to the properties such as the water repellency of the material used. The thickness of the contact angle-increasing film can be, for example, 1 nm to 50 nm.

The coated glass sheet of the present embodiment can be produced by, for example, preparing the coated glass sheet obtained by the method for producing the coated glass sheet described in Embodiment 1, and applying a treatment liquid containing a material for forming the contact angle-increasing film onto the surface of the coating film of the coated glass sheet. The treatment liquid can be prepared by adding a solvent to the material for forming the contact angle-increasing film.

The contact angle on the contact angle-increasing film is not particularly limited, since it is sufficient for the contact angle to be larger than that on the surface of the coating film. For example, the water contact angle on the contact angle-increasing film is 50 to 110° and preferably 70 to 110°.

Embodiment 3

Another embodiment of the coated glass sheet of the present invention will be described. The coated glass sheet according to the present embodiment has a structure identical to those of the coated glass sheets according to Embodiments 1 and 2, except that the porous layer has a different structure. Therefore, the porous layer in particular will be described in detail in the present embodiment.

As the glass sheet and the dense layer in the coated glass sheet of present embodiment, the glass sheet and the dense layer described in Embodiment 1 can be used.

The porous layer includes fine silica particles and a binder for the fine silica particles.

The fine silica particles form skeletons in the porous layer. The average particle diameter of the fine silica particles is, for example, 50 to 200 nm, preferably 75 to 150 nm, and more preferably 75 to 120 nm. The "average particle diameter" described herein refers to a particle diameter (D50) at a cumulative volume percentage of 50% in a particle size distribution measured by a laser diffraction particle size distribution analysis method.

As the fine silica particles, hollow fine silica particles can be used. However, in a case where the durability of the porous layer is regarded as important, it is preferable to use solid (non-hollow) fine silica particles.

The binder for the fine silica particles is present between the fine silica particles and a under layer (the dense layer, for example) and between the fine silica particles adjacent to each other, and serves to increase the bonding strengths therebetween. As the binder, a metal oxide such as an oxide of silicon (silica), an oxide of titanium, an oxide of aluminum, an oxide of zirconium, and an oxide of tantalum is preferable, and the oxide of silicon is most preferable. The oxide of silicon (silica) has high affinity for the fine silica particles and thus excels as a reinforcing agent. The oxide of silicon (silica) has a low refractive index and thus does not impair the antireflective effect provided by the coating film. Therefore, it is preferable for the binder for the fine silica particles to contain the oxide of silicon (silica) as a main component. The main component of the binder, as defined herein, refers to a component whose content is highest in the binder.

When the binder of the porous layer contains the oxide of silicon (silica) as a main component, the binder may further contain an oxide of at least one element selected from the group consisting of titanium and zirconium. The porous layer further containing an oxide of zirconium as the binder allows the coated glass sheet to have a higher transmittance gain. The reason why the addition of an oxide of zirconium increases the transmittance gain is not clear. The inventors think this is because the binder becomes denser when containing an oxide of zirconium, and thus the porosity of the porous layer is increased, reducing the apparent refractive index of the coating film. It is believed that the transmittance gain can be further increased thereby. The addition of an oxide of zirconium enhances the alkali resistance of the porous layer. Also, when the binder for the porous layer contains an oxide of titanium (titania, that is, $TiO_2$), the alkali resistance of the porous layer can be enhanced.

When the binder containing silica as a main component further contains an oxide of at least one element selected from the group consisting of titanium and zirconium, the content of the oxide of zirconium is, in terms of $ZrO_2$ content, preferably 5 mass % or less relative to the silica contained in the binder, and the content of the oxide of titanium is, in terms of $TiO_2$ content, preferably 5 mass % or less relative to the silica contained in the binder.

As the source of the binder, there can be used a hydrolyzable metal compound typified by a silicon alkoxide. Examples of the silicon alkoxide include tetramethoxysilane, tetraethoxysilane, and tetraisopropoxysilane. Such a hydrolyzable metal compound can be formed into an oxide for the binder by a so-called sol-gel process in which the hydrolyzable metal compound is hydrolyzed and polycondensed.

It is preferable for the hydrolyzable metal compound to be hydrolyzed in a solution in which the fine silica particles are present. This is because the polycondensation reaction between silanol groups present on the surfaces of the fine silica particles and silanol groups produced by the hydrolysis of the metal compound such as the silicon alkoxide is accelerated, and thereby the proportion of the binder contributing to the enhancement of the bonding strength among the fine silica particles is increased. Specifically, it is preferable to prepare the coating liquid for porous layer formation by adding successively the hydrolysis catalyst and the silicon alkoxide to the solution containing the fine silica particles while stirring the solution.

The ratio between the fine silica particles and the binder (the fine silica particles:the binder) in the porous layer is, for example, 65:35 to 93:7, and preferably 80:20 to 93:7 on a basis of mass. In the porous layer composed of the fine silica particles and the binder falling in these ranges of ratio, proper voids are secured among the skeletons formed of the fine silica particles, increasing the transmittance gain of the coated glass sheet. Moreover, the voids secured among the skeletons formed of the fine silica particles reduce the apparent refractive index of the porous layer. Thereby, the antireflective effect is enhanced and the binder contributes to maintaining the strength of the skeletons formed of the fine silica particles. When the proportion of the binder is excessively high, the voids among the fine silica particles are lost. Conversely, when the proportion of the binder is excessively low, the strengths of the skeletons formed of the fine silica particles are reduced.

Next, the coated glass sheet including the porous layer that includes the fine silica particles and the binder as mentioned above will be described with more specific examples. The examples of the coated glass sheet described below each are, for example, a coated glass sheet that can be used as a cover glass disposed on the light-incident side in a photoelectric conversion device, such as one for house roofs, that should take reflected light into account, the coated glass sheet being configured so that a coating film is provided on a figured glass sheet having a surface on which asperities for dispersing the reflected light are formed.

In the first example of the coated glass sheet according to the present embodiment, the one principal surface of the glass sheet has surface asperities. The surface asperities of the glass sheet have a mean spacing Sm of 0.4 mm or more and 2.5 mm or less, and an arithmetic average roughness Ra of 0.5 µm to 5 µm. The coating film is formed on the surface asperities of the glass sheet. As described above, the coating film includes the dense layer and the porous layer, and the positional relationship between the dense layer and the porous layer is as described in Embodiment 1. In the first example, in the porous layer of the coating film, the fine silica particles are arranged in a single layer on peak portions of the surface asperities, and the fine silica particles are arranged to be built up to a thickness equivalent to that of at least three layers of the fine silica particles at bottom portions of the surface asperities.

In the coated glass sheet of the first example, the transmittance gain is 1.5% or more, preferably 2.0% or more, and more preferably 2.4% or more, the transmittance gain being calculated by subtracting an average transmittance of the glass sheet as determined by applying light having wavelengths of 380 to 1100 nm to the glass sheet in the absence of the coating film on the surface of the glass sheet from an average transmittance of the coated glass sheet as determined by applying light having wavelengths of 380 to 1100 nm to the coated glass sheet from a side on which the coating film lies.

In the first example, the fine silica particles are, as described above, arranged in a single layer (one layer), in other words, arranged without being built up on each other, on the peak portions of the surface asperities of the glass sheet. On the other hand, at the bottom portions of the surface asperities, the fine silica particles are arranged to a thickness equivalent to that of three layers of the fine silica particles or more, and preferably four layers of the fine silica particles or more. The thickness distribution of the porous layer caused by the difference in the number of layers of the fine silica particles flattens the curve of the reflectance from the coated glass sheet in a visible range. Thereby, the reflectance falls within a limited range of 1.5 to 3% in a wavelength range of 380 to 1100 nm, and moreover, the difference between the highest reflectance and the lowest reflectance can be 1% or less in this wavelength range.

When the fine silica particles have an average particle diameter of r and the porous layer has a thickness of 3r or more at the bottom portions of the surface asperities, the porous layer has a thickness equivalent to or more than that of three layers of the fine silica particles. The number of layers of the fine silica particles and the thickness thereof can be determined by actually observing the cross-section of the antireflective film with an SEM or the like. The range of the average particle diameter r of the fine silica particles is as described above.

In the second example of the coated glass sheet according to the present embodiment, the one principal surface of the glass sheet has surface asperities. The surface asperities of the glass sheet have a mean spacing Sm of 0.3 mm or more and 2.5 mm or less, and an arithmetic average roughness Ra of 0.3 µm to 5 µm. In this example, the arithmetic average roughness Ra of the surface asperities of the glass sheet is preferably 0.4 µm to 2 µm, and more preferably 0.5 µm to 1.5 µm. The coating film is formed on the surface asperities of the glass sheet. As described above, the coating film includes the dense layer and the porous layer, and the positional relationship between the dense layer and the porous layer is as described in Embodiment 1. In the second example, the fine silica particles are uniformly arranged in a single layer on the peak portions of the surface asperities in such a manner that a filling factor F defined by the formula (1) below is 35 to 65% in the porous layer of the coating film.

$$F = A/B \times 100 \quad (1)$$

A: The number of the fine silica particles present in a square area with each side having a length 10 times the average particle diameter of the fine silica particles.

B: The number of spheres each having a diameter equal to the average particle diameter of the fine silica particles, assuming that the spheres are in closest-packing in the square area.

The values of A and B defined herein are determined by counting only the spheres that are completely included in the square area without counting the spheres that are partially included therein.

In the coated glass sheet of the second example, the transmittance gain is 2.2% or more, the transmittance gain being calculated by subtracting an average transmittance of the glass sheet as determined by applying light having wavelengths of 380 to 1100 nm to the glass sheet in the absence of the coating film on the surface of the glass sheet from an average transmittance of the coated glass sheet as determined by applying light having wavelengths of 380 to 1100 nm to the coated glass sheet from a side on which the coating film lies.

In the second example, the fine silica particles are, as described above, arranged in a single layer (one layer), in other words, arranged without being built up on each other on the peak portions of the surface asperities of the glass sheet. On the other hand, at the bottom portions of the surface asperities, the fine silica particles are built up, for example, to a thickness equivalent to a thickness 1.5 to 2.1 times the average particle diameter of the fine silica particles. The layer thickness of the fine silica particles can be determined by observing the cross-section of the porous layer with an SEM or the like. The thickness distribution of the porous layer caused by the difference in the number of layers of the fine silica particles flattens the curve of the reflectance from the coated glass sheet in a visible range. Thereby, appearance deterioration (color unevenness) due to uneven reflection can be reduced. The range of the average particle diameter of the fine silica particles is as described above.

In the second example, the fine silica particles are, as described above, uniformly arranged in a single layer on the peak portions of the surface asperities in such a manner that the filling factor F defined by the formula (1) above is 35 to 65% in the porous layer of the coating film. Saying "being uniformly arranged" refers to a state in which the fine silica particles are arranged so that when the arrangement of the fine silica particles in the porous layer on the peak portions of the surface asperities is observed with an SEM, there is no part where the spacing between the fine silica particles (the distance between the centers of the fine silica particles adjacent to each other) is extremely large as compared to other parts on the peak portions of the surface asperities. For example, it refers to a state in which the fine silica particles are arranged so that the spacing between the fine silica particles is 1.1 to 1.6 times the average particle diameter of the fine silica particles.

The filling factor F indicates the dense/sparse state of the fine silica particles arranged. When the filling factor F is higher than 65% and the fine silica particles arranged on the peak portions of the surface asperities are dense, it is difficult to increase the transmittance gain. When the filling factor F is lower than 65%, it is difficult to arrange the fine silica particles uniformly and to increase the transmittance gain. The filling factor F is preferably 40 to 60%, and more preferably 45 to 55%.

In the coated glass sheet of the first example and that of the second example, the surface asperities of the glass sheet have an average inclination angle θ of preferably 0.05 to 1.0 degree, particularly preferably 0.1 to 0.5 degrees, the average inclination angle θ being represented by $\theta = \tan^{-1}(4Ra/Sm)$. The smaller the average inclination angle θ is, the gentler the asperities of the glass surface are. This makes it difficult to obtain a sufficient thickness distribution when forming the film, which may cause an appearance defect. The larger the average inclination angle θ is, the steeper the asperities of the glass surface are. This raises a possibility that the film is not formed on the peak portions of the protrusions and the glass sheet is exposed, which tends to increase the reflectance.

The coated glass sheet of the present embodiment can be produced, for example, by a production method including the step of forming a coating film on one principal surface of a glass sheet, wherein the step includes:

(a) forming a wet film for dense layer formation using a coating liquid for dense layer formation, and drying the wet film for dense layer formation, (b) forming a wet film for porous layer formation using a coating liquid for porous layer formation containing a binder raw material and fine silica particles, and drying the wet film for porous layer formation, (c) calcining the dried film for dense layer formation, and (d) calcining the dried film for porous layer formation.

In the step of forming the coating film according to the present embodiment, the steps of forming the dense layer (the steps (a) and (c)) are identical to the steps (A) and (C) described in Embodiment 1. Therefore, only the step of forming the porous layer will be described in detail herein.

As described in the steps (b) and (d) above, the porous layer, which is a fine particle-containing layer, can be produced by providing the coating liquid for porous layer formation containing a compound (the binder raw material) used as the source of a binder and the fine silica particles onto a under layer (such as the wet film for dense layer formation or the dense layer) to form the wet film for porous layer formation, and then drying the wet film for porous layer formation and further heating the dried film for porous layer formation. The coating liquid for porous layer formation can be provided by, for example, dipping the glass sheet having a surface on which the wet film for dense layer formation or the dense layer is formed into the coating liquid for porous layer formation. However, a process of spraying the coating liquid for porous layer formation on the glass sheet having a surface on which the wet film for dense layer formation or the dense layer is formed is excellent in production efficiency and suitable for mass production.

Although the spraying process is suitable for mass production considering production efficiency, the process has a problem in that it easily causes the film thickness to be uneven when employed for mass production. This unevenness is due to a mist of the coating liquid emitted from a spray gun and an overlap of the distribution (spray pattern) of the mist, resulting in uneven reflection color of a size of about several millimeters in diameter.

The uneven reflection color due to the spraying process could be observed regardless of whether the surface of the glass sheet on which the porous layer is formed is smooth or has asperities. The uneven reflection color is eliminated consequently when the shape of the surface asperities falls within the above-mentioned range.

The method of forming the porous layer by the spraying process will be described. There will be described, as an example, a case in which the porous layer is formed directly on the dense layer. First, the glass sheet having a surface on which the wet film for dense layer formation or the dense layer is formed is prepared. The coating liquid for porous layer formation containing the fine silica particles and the binder raw material for the fine silica particles is sprayed on the wet film for dense layer formation or the dense layer formed on the glass sheet. For example, the coating liquid for porous layer formation is sprayed, from above the glass sheet held horizontally, with a spray gun held at a fixed distance from the glass sheet.

Next, the glass sheet with the coating liquid for porous layer formation sprayed thereon is placed, for example, in an electric furnace at 300 to 400° C. for 30 to 90 seconds to dry the coating liquid, so that the solvent or the like contained in the coating liquid is removed. Furthermore, the glass sheet is placed, for example, in an electric furnace at 700 to 800° C. for 3 to 5 minutes, so that an oxide is produced from the metal compound contained in the coating liquid to produce the binder for the fine silica particles.

The coating liquid for porous layer formation may contain a surfactant. As the surfactant, a silicon-based surfactant or a fluorine-based surfactant is suitable. The concentration of the surfactant in the coating liquid for porous layer formation is preferably 0.005 mass % or more to 0.5 mass % or less, and particularly preferably 0.01 mass % or more to 0.3 mass % or less. By containing the surfactant, the coating liquid for porous layer formation has a lower surface tension. Thereby, the agglomeration of the fine particles is accelerated as the wet film for porous layer formation is condensed when the wet film for porous layer formation is dried. Consequently, the porous layer is believed to be formed preferably because even in a case where the glass sheet is a figured glass sheet having surface asperities and the surface of the dense layer reflects the shape of the surface asperities, the fine particles are accumulated in the recesses of the asperities.

EXAMPLES

Hereinafter, the present invention will be described in more detail with reference to examples. However, the present invention is not limited to the examples given below as long as the invention is within the scope of the preset invention.

First, methods for evaluation of various properties of coated glass sheets produced in Examples and Comparative Example will be described.

(Transmission Properties and Transmittance Gain)

Transmittance curves (transmission spectra) of glass sheets were measured using a spectrophotometer (UV-3100, an ultraviolet-visible spectrophotometer manufactured by Shimadzu Corporation) before and after the formation of coating films. The average transmittance was calculated by averaging the values of transmittance in the wavelength range of 380 to 1100 nm. The increase in average transmittance of each glass sheet provided with a coating film relative to the glass sheet unprovided with the coating film was determined as a transmittance gain.

(Durability)

The coated glass sheets were evaluated for durability by a high temperature humidity test. A specimen of each of the coated glass sheets was placed in a thermostatic bath set at a temperature of 85° C. and a relative humidity of 85%, and left for 1000 hours. After that, the specimen was taken out of the thermostatic bath and washed with running water, and then dried. The difference in average transmittance between before and after the high temperature humidity test was measured. When the difference was within ±0.8%, the coated glass sheet was determined to have an excellent durability. To measure the average transmittances before and after the high temperature humidity test, the same spectrophotometer as that used for the "Transmission properties and transmittance gain" above was used. For the measurement, the glass sheet surface unprovided with the coating film was covered with a sheet of cover glass using dipropylene glycol as an immersion liquid in order to eliminate the impact of the high temperature humidity test on the glass sheet surface unprovided with the coating film.

(Ease of Removal of Adhering Matter: Part 1)

A commercially-available laminated glass interlayer for solar cells (EVA SKY, an ethylene-vinyl alcohol copolymer material manufactured by Bridgestone Corporation) was cut into a 20×30 mm piece, the piece of the interlayer was put on the coating film of the coated glass sheet, and the coated glass sheet was placed in an oven set at 150° C. for 5 minutes. After that, the coated glass sheet was taken out of the oven and left to cool to room temperature, and then the interlayer was stripped from the coated glass sheet.

The region of the coated glass sheet on which the interlayer had been placed was rubbed with a cellulose-based non-woven fabric (BEMCOT (registered trademark) manufactured by Asahi Kasei Fibers Corporation) impregnated with ethanol, and thus the interlayer material remaining adhered to the coating film after the stripping of the interlayer was wiped off. This wiping can remove the interlayer material remaining on the surface of the coating film, but cannot remove the interlayer material having penetrated into the coating film.

The difference in reflection color between the wiped region (referred to as "adhesion portion") of the coating film to which the interlayer material had adhered and the region (referred to as "non-adhesion portion") on which the interlayer was not placed was visually examined, and the antifouling properties of the coating film were evaluated according to the following criteria.

Excellent: There was little difference in reflection color between the adhesion portion and the non-adhesion portion.

Good: There was a difference in reflection color between the adhesion portion and the non-adhesion portion, but the difference was slight.

Moderate: There was a difference in reflection color between the adhesion portion and the non-adhesion portion.

Poor: There was a clear difference in reflection color between the adhesion portion and the non-adhesion portion.

(Ease of Removal of Adhering Matter: Part 2)

The ease of removal of adhering matter was tested in the same manner as in "Ease of removal of adhering matter: Part 1" described above, except that the time during which the coated glass sheet with the interlayer placed on the coating film was placed in the oven set at 150° C. was changed to 30 minutes. The criteria for evaluation of the antifouling properties were also the same as those employed in "Ease of removal of adhering matter: Part 1".

Example 1

<Preparation of Coating Liquid for Dense Layer Formation>

An amount of 10.4 parts by mass of tetraethoxysilane (ethyl orthosilicate manufactured by TAMA CHEMICALS CO., LTD.), 15.7 parts by mass of isopropyl alcohol (IPA), 0.3 parts by mass of 1 N nitric acid, and 3.6 parts by mass of purified water were mixed and stirred, and a hydrolysis reaction was allowed to proceed at 40° C. for 8 hours, resulting in a hydrolysate solution having a silica solids concentration of 10 mass %. The hydrolysate solution was diluted with isopropyl alcohol to obtain a hydrolysate solution A having a silica solids concentration of 3 mass % in terms of $SiO_2$ content.

An amount of 2.0 g of the hydrolysate solution A, 5.46 g of isopropyl alcohol, 1.82 g of a $TiO_2$ source (a 75% isopropyl alcohol solution of (titanium(diisopropoxide)bis (2,4 pentadionate) diluted with IPA to a concentration of 1 mass %), and 0.71 g of an $Al_2O_3$ source (a 1 mass % aqueous solution of $AlCl_3.6H_2O$) were mixed and stirred to obtain a coating liquid for dense layer formation of Example 1. In the coating liquid for dense layer formation of Example 1, the parts by mass of an aluminum compound in terms of $Al_2O_3$ content was 2.5 parts by mass, and the parts by mass of a titanium compound in terms of $TiO_2$ content was 6.7 parts by mass, relative to 100 parts by mass of a silicon oxide in terms of $SiO_2$ content.

<Preparation of Coating Liquid for Porous Layer Formation>

In Example 1, the porous layer included in the coating film of the coated glass sheet according to Embodiments 1 and 2 was formed. That is, the porous layer including the closed pores present within the porous layer and the matrix was formed. As the matrix raw material for the coating liquid for porous layer formation, methyltriethoxysilane (MTES manufactured by TAMA CHEMICALS CO., LTD.) was used. Thus, an MTES hydrolysate solution was prepared first. Specifically, 64.38 g of IPA (solvent), 8.05 g of purified water, 1.0 g of 1 N nitric acid (hydrolysis catalyst), and 26.57 g of MTES were weighed into a glass bottle, and a hydrolysis reaction was allowed to proceed at 40° C. for 8 hours, resulting in a hydrolysate solution (MTES hydrolysate solution) having a solids concentration of 10 mass %. Next, 3.0 g of this MTES hydrolysate solution, 6.25 g of IPA (solvent), 0.30 g of 3-methoxy-1-butanol (solvent), and 0.75 g of a fine organic polymer particle dispersion (pore forming agent) ("EPOSTAR MX-050", crosslinked polymethylmethacrylate dispersion, manufactured by NIPPON SHOKUBAI CO., LTD., containing fine particles with an average particle diameter of 0.05 to 0.10 μm, and having a solids concentration of 10.0 mass %) were placed in a glass container to obtain a coating liquid. The content of the pore forming agent shown for the coating liquid in Table 1 represents the parts by mass of the pore forming agent relative to 100 parts by mass of the matrix raw material contained in the coating liquid (relative to 100 parts by mass of a product of hydrolysis and condensation of the substance used as the matrix raw material).

<Preparation of Glass Sheet>

In Example 1, the glass sheet used was a figured glass sheet. This figured glass sheet was a 3.2-mm-thick glass sheet manufactured by Nippon Sheet Glass Co., Ltd. This figured glass sheet has a common soda-lime-silicate composition and has surface asperities for which the arithmetic average roughness Ra and the mean spacing Sm are 0.76 μm and 1120 μm, respectively, as determined over an evaluation length of 1 cm (according to JIS B 0601-1994). This figured glass sheet was cut into a 100×100 mm piece, which was immersed in an alkaline solution (a 25 wt % aqueous KOH solution) and washed with the aid of an ultrasonic cleaner. The piece of the figured glass was then washed with deionized water and dried at ordinary temperature. The resulting glass sheet was used for formation of a coating film. The transmission properties of this glass sheet were examined as described above before coating film formation and, as a result, the average transmittance was determined to be 91.7%.

<Formation of Coating Film>

The coating liquid for dense layer formation and the coating liquid for porous layer formation were applied by spin coating. Specifically, the glass sheet as prepared above was horizontally positioned in a spin coating system, the coating liquid for dense layer formation was dripped onto the central portion of the glass sheet, and the glass sheet was rotated at 1000 rpm and kept rotating at this rotation speed for 10 seconds, after which the rotation of the glass sheet was stopped. Thereby, a wet film for dense layer formation was formed on one principal surface of the glass sheet. Subsequently, the wet film for dense layer formation was dried by removing the solvent from the wet film for dense layer formation. The drying was carried out as follows: The glass sheet with the wet film for dense layer formation formed on one principal surface thereof was placed in an electric furnace set at 350° C. for 60 seconds, after which the glass sheet was taken out of the electric furnace and left to cool to room temperature. Next, the glass sheet with the dried film for dense layer formation formed on one principal surface thereof was horizontally positioned in the spin coating system, the coating liquid for porous layer formation was dripped onto the central portion of the dried film for dense layer formation on the glass sheet, and the glass sheet was rotated at 650 rpm and kept rotating at this rotation speed for 10 seconds, after which the rotation of the glass sheet was stopped. Thereby, the wet film for porous layer formation was formed on the dried film for dense layer formation. Subsequently, the wet film for porous layer formation was dried by removing the solvent from the wet film for porous layer formation. The drying was carried out as follows: The glass sheet with a stack of the dried film for dense layer formation and the wet film for porous layer formation formed on one principal surface thereof was placed in an electric furnace set at 350° C. for 60 seconds, after which the glass sheet was taken out of the electric furnace and left to cool to room temperature. Next, the stack of the dried film for dense layer formation and the dried film for porous layer formation was calcined. The calcination was accomplished by placing the dried films in an electric furnace set at 760° C. for 5 minutes. This resulted in a coating film composed of the dense layer and the porous layer disposed on the glass sheet in this order.

Example 2

<Preparation of Coating Liquid for Dense Layer Formation>

An amount of 2.0 g of the hydrolysate solution A prepared in Example 1, 6.79 g of isopropyl alcohol, 0.78 g of a $ZrO_2$ source (a 1 mass % aqueous solution of $ZrOCl_2.8H_2O$), and 0.43 g of an $Al_2O_3$ source (a 1 mass % aqueous solution of $AlCl_3.6H_2O$) were mixed and stirred to obtain a coating liquid for dense layer formation of Example 2. The parts by mass of an aluminum compound in terms of $Al_2O_3$ content was 1.5 parts by mass, and the parts by mass of a zirconium compound in terms of $ZrO_2$ content was 5 parts by mass, relative to 100 parts by mass of a silicon oxide in terms of $SiO_2$ content.

<Preparation of Coating Liquid for Porous Layer Formation>

In Example 2, a coating liquid for porous layer formation identical to that used in Example 1 was prepared.

<Preparation of Glass Sheet>

In Example 2, a glass sheet identical to that used in Example 1 was prepared.

<Formation of Coating Film>

In Example 2, a coated glass sheet was produced in the same manner as in Example 1.

Example 3

<Preparation of Coating Liquid for Dense Layer Formation>

An amount of 2.0 g of the hydrolysate solution A prepared in Example 1, 7.29 g of isopropyl alcohol, and 0.71 g of an $Al_2O_3$ source (a 1 mass % aqueous solution of $AlCl_3.6H_2O$) were mixed and stirred to obtain a coating liquid for dense layer formation of Example 3. The parts by mass of an aluminum compound in terms of $Al_2O_3$ content was 2.5 parts by mass relative to 100 parts by mass of a silicon oxide in terms of $SiO_2$ content.

<Preparation of Coating Liquid for Porous Layer Formation>

In Example 3, a coating liquid for porous layer formation identical to that used in Example 1 was prepared.

<Preparation of Glass Sheet>

In Example 3, a glass sheet identical to that used in Example 1 was prepared.

<Formation of Coating Film>

In Example 3, a coated glass sheet was produced in the same manner as in Example 1.

Example 4

<Preparation of Coating Liquid for Dense Layer Formation>

An amount of 2.0 g of the hydrolysate solution A prepared in Example 1, 7.22 g of isopropyl alcohol, and 0.78 g of a $ZrO_2$ source (a 1 mass % aqueous solution of $ZrOCl_2.8H_2O$) were mixed and stirred to obtain a coating liquid for dense layer formation of Example 4. The parts by mass of a zirconium compound in terms of $ZrO_2$ content was 5 parts by mass relative to 100 parts by mass of a silicon oxide in terms of $SiO_2$ content.

<Preparation of Coating Liquid for Porous Layer Formation>

In Example 4, a coating liquid for porous layer formation identical to that used in Example 1 was prepared.

<Preparation of Glass Sheet>

In Example 4, a glass sheet identical to that used in Example 1 was prepared.

<Formation of Coating Film>

In Example 4, a coated glass sheet was produced in the same manner as in Example 1.

Example 5

<Preparation of Coating Liquid for Dense Layer Formation>

An amount of 2.0 g of the hydrolysate solution A prepared in Example 1, 6.91 g of isopropyl alcohol, and 1.09 g of a $TiO_2$ source (a 75% isopropyl alcohol solution of (titanium (diisopropoxide)bis(2,4 pentadionate) diluted with IPA to a concentration of 1 mass %) were mixed and stirred to obtain a coating liquid for dense layer formation of Example 5. The parts by mass of a titanium compound in terms of $TiO_2$ content was 4 parts by mass relative to 100 parts by mass of a silicon oxide in terms of $SiO_2$ content.

<Preparation of Coating Liquid for Porous Layer Formation>

In Example 5, a coating liquid for porous layer formation identical to that used in Example 1 was prepared.

<Preparation of Glass Sheet>

In Example 5, a glass sheet identical to that used in Example 1 was prepared.

<Formation of Coating Film>

In Example 5, a coated glass sheet was produced in the same manner as in Example 1.

Example 6

<Preparation of Coating Liquid for Dense Layer Formation>

An amount of 2.0 g of the hydrolysate solution A prepared in Example 1 and 8.00 g of isopropyl alcohol were mixed and stirred to obtain a coating liquid for dense layer formation of Example 6.

<Preparation of Coating Liquid for Porous Layer Formation>

In Example 6, a coating liquid for porous layer formation identical to that used in Example 1 was prepared.

<Preparation of Glass Sheet>

In Example 6, a glass sheet identical to that used in Example 1 was prepared.

<Formation of Coating Film>

In Example 6, a coated glass sheet was produced in the same manner as in Example 1.

Example 7

In Example 7, a coated glass sheet was produced in which a contact angle-increasing film was provided on the coating film of the coated glass sheet as produced in Example 1. The contact angle-increasing film was formed using the below-described coating liquid for contact angle-increasing film formation.

<Preparation of Coating Liquid for Contact Angle-Increasing Film Formation>

There was prepared an MTES hydrolysate solution (solids concentration: 10 mass %) identical to the MTES hydrolysate solution used in Example 1 to prepare a coating liquid for porous layer formation. This MTES hydrolysate solution was diluted with IPA to a solids concentration of 3 mass %. An amount of 0.67 g of the diluted MTES hydrolysate solution having a solids concentration of 3 mass %, 8.83 g of IPA, 0.26 g of a 1 mass % aqueous solution of zirconium oxychloride octahydrate ($ZrOCl_2.8H_2O$), and 0.24 g of a 1 mass % aqueous solution of aluminum chloride hexahydrate ($AlCl_3.6H_2O$) were mixed to obtain a coating liquid for contact angle-increasing film formation.

<Formation of Contact Angle-Increasing Film>

A coated glass sheet identical to the coated glass sheet of Example 1 was prepared. The coated glass sheet prepared was horizontally positioned in a spin coating system, the coating liquid for contact angle-increasing film formation was dripped onto the central portion of the coating film, and the glass sheet was rotated at 1000 rpm and kept rotating at this rotation speed for 10 seconds, after which the rotation of the glass sheet was stopped. This resulted in the formation of a wet film for contact angle-increasing film formation on the coating film. Subsequently, the wet film for contact angle-increasing film formation was dried by removing the solvent from the wet film. The drying was carried out as follows: The coated glass sheet with the wet film for contact angle-increasing film formation was placed in an electric furnace set at 350° C. for 60 seconds, after which the coated glass sheet was taken out of the electric furnace and left to cool to room temperature.

Example 8

In Example 8, a coated glass sheet was produced in which a contact angle-increasing film was provided on the coating film of the coated glass sheet as produced in Example 1. The contact angle-increasing film was formed using the below-described coating liquid for contact angle-increasing film formation.

<Preparation of Coating Liquid for Contact Angle-Increasing Film Formation>

The MTES hydrolysate solution having a solids concentration of 3 mass % used in Example 7 was employed as a coating liquid for contact angle-increasing film formation of Example 8.

<Formation of Contact Angle-Increasing Film>

In Example 8, a contact angle-increasing film was formed in the same manner as in Example 7.

Example 9

<Preparation of Coating Liquid for Dense Layer Formation>

In Example 9, a coating liquid for dense layer formation identical to that used in Example 1 was prepared.

<Preparation of Coating Liquid for Porous Layer Formation>

In Example 9, a coating liquid for porous layer formation identical to that used in Example 1 was prepared.

<Preparation of Glass Sheet>

In Example 9, a glass sheet identical to that used in Example 1 was prepared.

<Formation of Coating Film>

The coating liquid for dense layer formation was applied onto one principal surface of the prepared glass sheet described above by spraying. The application by spraying was carried out by spraying, using a commercially-available spray gun, the coating liquid for dense layer formation from above one principal surface of the glass sheet positioned horizontally. This resulted in the formation of a wet film for dense layer formation on one principal surface of the glass sheet. Subsequently, the wet film for dense layer formation was dried by removing the solvent from the wet film for dense layer formation. The drying was carried out as follows: The glass sheet with the wet film for dense layer formation formed on one principal surface thereof was placed in an electric furnace set at 350° C. for 60 seconds, after which the glass sheet was taken out of the electric furnace and left to cool to room temperature. Next, the glass sheet with the dried film for dense layer formation formed on one principal surface thereof was horizontally positioned in a spin coating system, the coating liquid for porous layer formation was dripped onto the central portion of the dried film for dense layer formation on the glass sheet, and the glass sheet was rotated at 650 rpm and kept rotating at this rotation speed for 10 seconds, after which the rotation of the glass sheet was stopped. This resulted in the formation of a wet film for porous layer formation on the dried film for dense layer formation. Subsequently, the wet film for porous layer formation was dried by removing the solvent from the wet film for porous layer formation. The drying was carried out as follows: The glass sheet with a stack of the dried film for dense layer formation and the wet film for porous layer formation formed on one principal surface thereof was placed in an electric furnace set at 350° C. for 60 seconds, after which the glass sheet was taken out of the electric furnace and left to cool to room temperature. Next, the stack of the dried film for dense layer formation and the dried film for porous layer formation was calcined. The calcination was accomplished by placing the dried film in an electric furnace set at 760° C. for 5 minutes. This resulted in a coating film composed of the dense layer and the porous layer disposed on the glass sheet in this order. The coating film thus obtained was observed with a field emission scanning electron microscope (S-4500, manufactured by Hitachi, Ltd.). FIG. 1 shows a result of observation of the coating film of Example 9 with the field emission scanning electron microscope.

<Preparation of Coating Liquid for Contact Angle-Increasing Film Formation>

In Example 9, a coating liquid for contact angle-increasing film formation identical to that used in Example 7 was prepared.

<Formation of Contact Angle-Increasing Film>

In Example 9, a contact angle-increasing film was formed in the same manner as in Example 7.

Example 10

<Preparation of Coating Liquid for Dense Layer Formation>

An amount of 20.4 parts by mass of tetraethoxysilane (ethyl orthosilicate manufactured by TAMA CHEMICALS CO., LTD.), 24.2 parts by mass of isopropyl alcohol (IPA), 0.6 parts by mass of 1 N nitric acid, and 14.4 parts by mass of purified water were mixed and stirred, and a hydrolysis reaction was allowed to proceed at 40° C. for 8 hours, resulting in a hydrolysate solution having a silica solids concentration of 10 mass %. The hydrolysate solution was diluted with isopropyl alcohol to obtain a hydrolysate solution B having a silica solids concentration of 6 mass % in terms of $SiO_2$ content. An amount of 50.0 g of the hydrolysate solution B, 949.2 g of isopropyl alcohol, and 0.80 g of a $ZrO_2$ source (a 50 mass % aqueous solution of $ZrOCl_2.8H_2O$) were mixed and stirred to obtain a coating liquid for dense layer formation of Example 10. The parts by mass of a zirconium compound in terms of $ZrO_2$ content was 9.2 parts by mass relative to 100 parts by mass of a silicon oxide in terms of $SiO_2$ content.

<Preparation of Coating Liquid for Porous Layer Formation>

As the matrix raw material for a coating liquid for porous layer formation of Example 10, methyltriethoxysilane (MTES manufactured by TAMA CHEMICALS CO., LTD.) and 3-glycidoxypropyltrimetoxysilane (GPTMS manufactured by Shin-Etsu Chemical Co., Ltd.) were used. That is, 10.25 g of a fine organic polymer particle dispersion (a pore forming agent identical to that used in Example 1), 0.05 g of GPTMS, 41.0 g of an MTES hydrolysate solution identical to that used in Example 1, and 3.00 g of 3-methoxy-1-butanol (solvent) were weighed, and IPA (solvent) was added thereto to be 100 g in total. The resulting liquid was stirred well to obtain the coating liquid. The content of the GPTMS in the matrix raw material shown for the coating liquid in Table 2 represents the percentage of the mass of a product of hydrolysis and condensation of the GPTMS to the total mass of a product of hydrolysis and condensation of the substance used as the matrix raw material. The mass of the product of hydrolysis and condensation of the GPTMS relative to 100 parts by mass of the pore forming agent contained in the coating liquid was 3.45 parts by mass.

<Preparation of Glass Sheet>

In Example 10, a glass sheet identical to that used in Example 1 was prepared.

<Formation of Coating Film>

In Example 10, a coated glass sheet was produced in the same manner as in Example 1.

Example 11

<Preparation of Coating Liquid for Dense Layer Formation>

In Example 11, a coating liquid for dense layer formation identical to that used in Example 10 was prepared.

<Preparation of Coating Liquid for Porous Layer Formation>

In Example 11, a coating liquid for porous layer formation was prepared in the same manner as in Example 10, except that 8.20 g of the pore forming agent and 0.04 g of the GPTMS were used. The mass of the product of hydrolysis and condensation of the GPTMS in the coating liquid was 3.45 parts by mass.

<Preparation of Glass Sheet>

In Example 11, a glass sheet identical to that used in Example 1 was prepared.

<Formation of Coating Film>

In Example 11, a coated glass sheet was produced in the same manner as in Example 1.

Example 12

<Preparation of Coating Liquid for Dense Layer Formation>

In Example 12, a coating liquid for dense layer formation identical to that used in Example 10 was prepared.

<Preparation of Coating Liquid for Porous Layer Formation>

In Example 12, a coating liquid for porous layer formation was prepared in the same manner as in Example 10, except that 14.35 g of the pore forming agent and 0.12 g of the GPTMS were used. The mass of the product of hydrolysis and condensation of the GPTMS in the coating liquid was 5.92 parts by mass.

<Preparation of Glass Sheet>

In Example 12, a glass sheet identical to that used in Example 1 was prepared.

<Formation of Coating Film>

In Example 12, a coated glass sheet was produced in the same manner as in Example 1.

Example 13

<Preparation of Coating Liquid for Dense Layer Formation>

In Example 13, a coating liquid for dense layer formation identical to that used in Example 10 was prepared.

<Preparation of Coating Liquid for Porous Layer Formation>

In Example 13, a coating liquid for porous layer formation was prepared in the same manner as in Example 10, except that 8.20 g of the pore forming agent and 0.02 g of the GPTMS were used. The mass of the product of hydrolysis and condensation of the GPTMS in the coating liquid was 1.72 parts by mass.

<Preparation of Glass Sheet>

In Example 13, a glass sheet identical to that used in Example 1 was prepared.

<Formation of Coating Film>

In Example 13, a coated glass sheet was produced in the same manner as in Example 1.

Comparative Example 1

A coated glass sheet was produced in the same manner as in Example 1, except that the dense layer was not formed. That is, the coating film of Comparative Example 1 was composed only of the porous layer, and produced by applying the coating liquid for porous layer formation of Example 1 directly onto one principal surface of the glass sheet. The method of preparing the coating liquid for porous layer formation and the method of forming the porous layer were identical to those used in Example 1.

Example 14

<Preparation of Coating Liquid for Dense Layer Formation>

In Example 14, a coating liquid for dense layer formation identical to that used in Example 1 was prepared.

<Preparation of Coating Liquid for Porous Layer Formation>

In Example 14, the porous layer included in the coating film of the coated glass sheet of Embodiment 3 was formed. That is, the porous layer including the fine silica particles and the binder for the fine silica particles was formed. An amount of 39.1 parts by mass of a fine silica particle dispersion (PL-7 manufactured by FUSO CHEMICAL CO., LTD., containing fine particles with an average particle diameter of 100 nm, and having a solids concentration of 23 mass %), 56.4 parts by mass of ethylcellosolve, and 1 parts by mass of 1 N hydrochloric acid (hydrolysis catalyst) were mixed and stirred. An amount of 3.5 parts by mass of tetraethoxysilane was added to the resulting mixture while the mixture was further stirred. Then, the mixture was continued to be stirred for 8 hours while being kept at 40° C. to obtain a stock solution. The stock solution had a solids concentration of 9 mass %. In the solids, the ratio between the fine particles and the binder (in terms of oxide content) was 90:10 on a basis of mass. The above-mentioned fine silica particles are solid (in other words, non-hollow) fine particles. Next, 11 parts by mass of the stock solution, 10.0 parts by mass of 3-methoxy-1-butanol, 78.8 parts by mass of 2-propanol, 0.02 parts by mass of a silicon-based surfactant (L7001 manufactured by Dow Corning Toray Co., Ltd.), and 0.34 parts by mass of a 50 mass % aqueous solution of zirconium oxychloride octahydrate (special grade, manufactured by KANTO CHEMICAL CO., INC.) were mixed and stirred to obtain a coating liquid for porous layer formation.

<Preparation of Glass Sheet>

In Example 14, a glass sheet identical to that used in Example 1 was prepared.

<Formation of Coating Film>

First, a wet film for dense layer formation was formed in the same manner as in Example 1, and the wet film was dried in the same manner as in Example 1. Next, the coating liquid for porous layer formation was applied onto the dried film for dense layer formation by spraying. The application by spraying was carried out by spraying, using a commercially-available spray gun, the coating liquid for porous layer formation from above the dried film for dense layer formation on the glass sheet positioned horizontally. Next, the glass sheet with a stack of the dried film for dense layer formation and the wet film for porous layer formation formed thereon was placed in an electric furnace set at 350° C. for 60 seconds to remove the solvent from the wet film for porous layer formation. After that, the stack of the dried film for dense layer formation and the dried film for porous layer formation was calcined. The calcination was accomplished by placing the dried film in an electric furnace set at 760° C. for 5 minutes. This resulted in a coating film composed of the dense layer and the porous layer disposed on the glass sheet in this order.

Example 15

<Preparation of Coating Liquid for Dense Layer Formation>

In Example 15, a coating liquid for dense layer formation identical to that used in Example 2 was prepared.

<Preparation of coating liquid for porous layer formation>

In Example 15, a coating liquid for porous layer formation identical to that used in Example 14 was prepared.

<Preparation of Glass Sheet>

In Example 15, a glass sheet identical to that used in Example 1 was prepared.

<Formation of Coating Film>

In Example 15, a coated glass sheet was produced in the same manner as in Example 14.

Example 16

<Preparation of Coating Liquid for Dense Layer Formation>

In Example 16, a coating liquid for dense layer formation identical to that used in Example 3 was prepared.

<Preparation of coating liquid for porous layer formation>

In Example 16, a coating liquid for porous layer formation identical to that used in Example 14 was prepared.

<Preparation of Glass Sheet>

In Example 16, a glass sheet identical to that used in Example 1 was prepared.

<Formation of Coating Film>

In Example 16, a coated glass sheet was produced in the same manner as in Example 14.

Example 17

<Preparation of Coating Liquid for Dense Layer Formation>

In Example 17, a coating liquid for dense layer formation identical to that used in Example 4 was prepared.

<Preparation of coating liquid for porous layer formation>
In Example 17, a coating liquid for porous layer formation identical to that used in Example 14 was prepared.
<Preparation of Glass Sheet>
In Example 17, a glass sheet identical to that used in Example 1 was prepared.
<Formation of Coating Film>
In Example 17, a coated glass sheet was produced in the same manner as in Example 14.

Example 18

<Preparation of Coating Liquid for Dense Layer Formation>
In Example 18, a coating liquid for dense layer formation identical to that used in Example 5 was prepared.
<Preparation of coating liquid for porous layer formation>
In Example 18, a coating liquid for porous layer formation identical to that used in Example 14 was prepared.
<Preparation of Glass Sheet>
In Example 18, a glass sheet identical to that used in Example 1 was prepared.
<Formation of Coating Film>
In Example 18, a coated glass sheet was produced in the same manner as in Example 14.

Example 19

<Preparation of Coating Liquid for Dense Layer Formation>
In Example 19, a coating liquid for dense layer formation identical to that used in Example 6 was prepared.
<Preparation of coating liquid for porous layer formation>
In Example 19, a coating liquid for porous layer formation identical to that used in Example 14 was prepared.
<Preparation of Glass Sheet>
In Example 19, a glass sheet identical to that used in Example 1 was prepared.
<Formation of Coating Film>
In Example 19, a coated glass sheet was produced in the same manner as in Example 14.

Table 1 shows the evaluation results (results of average transmittance, transmittance gain, durability, and ease of removal of adhering matter) on the coated glass sheets of Examples 1 to 6 each having a structure identical to that of the coated glass sheet of Embodiment 1, the coated glass sheets of Examples 7 to 9 each having a structure identical to that of the coated glass sheet of Embodiment 2, and the coated glass sheet of Comparative Example 1. Table 2 shows the evaluation results (results of average transmittance, transmittance gain, durability, and ease of removal of adhering matter) on the coated glass sheets of Examples 10 to 13 each having a structure identical to that of the coated glass sheet of Embodiment 1. Table 3 shows the evaluation results (results of average transmittance, transmittance gain, and durability) on the coated glass sheets of Examples 14 to 19 each having a structure identical to that of the coated glass sheet of Embodiment 3. Table 3 also shows the contents (mass %) of the fine particles, the $SiO_2$ binder, and $ZrO_2$ in the porous layer.

TABLE 1

| | | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|
| Dense layer of coating film Parts by mass of each component relative to 100 parts by mass of $SiO_2$ | Layer composition | | | | | | | | | | Unprovided with dense layer |
| | $SiO_2$ | 100 | 100 | 100 | 100 | 100 | 100 | 100 | 100 | 100 | |
| | $Al_2O_3$ | 2.5 | 1.5 | 2.5 | 0 | 0 | 0 | 2.5 | 2.5 | 2.5 | |
| | $TiO_2$ | 6.7 | 0 | 0 | 0 | 4 | 0 | 6.7 | 6.7 | 6.7 | |
| | $ZrO_2$ | 0 | 5 | 0 | 5 | 0 | 0 | 0 | 0 | 0 | |
| | Layer thickness nm | 13 | 12 | 10 | 10 | 10 | 10 | 13 | 13 | 30 | |
| Porous layer of coating film | Liquid composition | | | | | | | | | | |
| | Matrix raw material | MTES | MTES | MTES | MTES | MTES | MTES | MTES | MTES | MTES | MTES |
| | Pore forming agent | MX-050 | MX-050 | MX-050 | MX-050 | MX-050 | MX-050 | MX-050 | MX-050 | MX-050 | MX-050 |
| | Parts by mass of pore forming agent relative to 100 parts by mass of matrix raw material | 25 | 25 | 25 | 25 | 25 | 25 | 25 | 25 | 25 | 25 |
| | Layer thickness nm | 110 | 110 | 110 | 110 | 110 | 110 | 110 | 110 | 110 | 110 |
| Contact angle-increasing film Parts by mass of each component relative to 100 parts by mass of $SiO_2$ | Liquid composition | Unprovided with contact angle-increasing film | Unprovided with contact angle-increasing film | Unprovided with contact angle-increasing film | Unprovided with contact angle-increasing film | Unprovided with contact angle-increasing film | Unprovided with contact angle-increasing film | | | | Unprovided with contact angle-increasing film |
| | MTES | | | | | | | 100 | 100 | 100 | |
| | $ZrO_2$ | | | | | | | 5 | 0 | 5 | |
| | $Al_2O_3$ | | | | | | | 2.5 | 0 | 2.5 | |
| | Film thickness nm | | | | | | | 6 | 5 | 6 | |
| Average transmittance [%] | | 94.93 | 94.85 | 94.80 | 94.75 | 94.80 | 94.71 | 94.70 | 94.80 | 94.70 | 94.79 |
| Transmittance gain [%] | | 3.0 | 3.0 | 2.9 | 2.8 | 2.9 | 2.8 | 2.8 | 2.9 | 2.8 | 2.9 |

TABLE 1-continued

|  | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| Difference in average transmittance between before and after high temperature humidity test [%] | −0.27 | −0.12 | −0.38 | −0.31 | −0.41 | −0.48 | −0.18 | −0.23 | −0.18 | −0.99 |
| Ease of removal of adhering matter: Part 1 | Good | Good | Good | Good | Good | Good | Excellent | Excellent | Excellent | Good |
| Ease of removal of adhering matter: Part 2 | Moderate | Moderate | Moderate | Moderate | Moderate | Moderate | Excellent | Excellent | Excellent | Moderate |

TABLE 2

|  |  | Example 10 | Example 11 | Example 12 | Example 13 |
|---|---|---|---|---|---|
| Dense layer of coating film | Layer composition |  |  |  |  |
| Parts by mass of each component SiO$_2$ | SiO$_2$ | 100 | 100 | 100 | 100 |
|  | ZrO$_2$ | 9.2 | 9.2 | 9.2 | 9.2 |
|  | Layer thickness nm | 25 | 25 | 25 | 25 |
| Porous layer of coating film | Liquid composition |  |  |  |  |
|  | Matrix raw material | MTES, GPTMS | MTES, GPTMS | MTES, GPTMS | MTES, GPTMS |
|  | Content of GPTMS in matrix raw material (Mass %) (On a basis of product of hydrolysis and condensation of GPTMS) | 0.86 | 0.68 | 2.0 | 0.34 |
|  | Pore forming agent | MX-050 | MX-050 | MX-050 | MX-050 |
|  | Parts by mass of pore forming agent relative to 100 parts by mass of matrix raw material | 24.8 | 19.9 | 34.3 | 20.0 |
|  | Layer thickness nm | 130 | 130 | 140 | 130 |
| Average transmittance [%] |  | 94.87 | 94.75 | 94.93 | 94.80 |
| Transmittance gain [%] |  | 3.0 | 2.8 | 3.0 | 2.9 |
| Difference in average transmittance between before and after high temperature humidity test [%] |  | −0.21 | −0.09 | −0.32 | −0.15 |
| Ease of removal of adhering matter: Part 1 |  | Good | Good | Good | Good |
| Ease of removal of adhering matter: Part 2 |  | Good | Good | Good | Good |

TABLE 3

|  |  | Example 14 | Example 15 | Example 16 | Example 17 | Example 18 | Example 19 |
|---|---|---|---|---|---|---|---|
| Dense layer of coating film | Layer composition |  |  |  |  |  |  |
| Parts by mass of each component relative to 100 parts by mass of SiO$_2$ | SiO$_2$ | 100 | 100 | 100 | 100 | 100 | 100 |
|  | Al$_2$O$_3$ | 2.5 | 1.5 | 2.5 | 0 | 0 | 0 |
|  | TiO$_2$ | 6.7 | 0 | 0 | 0 | 4 | 0 |
|  | ZrO$_2$ | 0 | 5 | 0 | 5 | 0 | 0 |
|  | Layer thickness nm | 13 | 12 | 10 | 10 | 10 | 10 |
| Porous layer of coating film | Layer composition |  |  |  |  |  |  |
| Mass % of each component in porous layer | Fine particles | 85.96 | 85.96 | 85.96 | 85.96 | 85.96 | 85.96 |
|  | SiO$_2$ binder | 9.55 | 9.55 | 9.55 | 9.55 | 9.55 | 9.55 |
|  | ZrO$_2$ added | 4.49 | 4.49 | 4.49 | 4.49 | 4.49 | 4.49 |
|  | Layer thickness nm | 150 | 150 | 150 | 150 | 150 | 150 |
| Average transmittance [%] |  | 94.30 | 94.30 | 94.20 | 94.20 | 94.30 | 94.10 |
| Transmittance gain [%] |  | 2.5 | 2.5 | 2.4 | 2.4 | 2.5 | 2.3 |
| Difference in average transmittance between before and after high temperature humidity test [%] |  | −0.18 | −0.21 | −0.29 | −0.21 | −0.12 | −0.46 |

As shown in Tables 1 and 2, the coated glass sheets of Examples 1 to 13 each exhibited high durability by having a transmittance gain of 2.8% or more and also showing a small difference in average transmittance between before and after the high temperature humidity test. By contrast, the coated glass sheet of Comparative Example 1 unprovided with the dense layer exhibited lower durability than those of the coated glass sheets of Examples 1 to 13, showing a large difference in average transmittance between before and after the high temperature humidity test.

The coated glass sheets of Examples 7 to 9 in which the contact angle-increasing film was provided on the coating film had excellent results in both of the "ease of removal of adhering matter: Part 1 test" and the "ease of removal of adhering matter: Part 2" test. By contrast, the coated glass sheets of Examples 1 to 6 and 10 to 13 unprovided with the contact angle-increasing film showed results inferior to those of the coated glass sheets of Examples 7 to 9 in the "ease of removal of adhering matter: Part 1" test and the "ease of removal of adhering matter: Part 2" test. In particular, in the "ease of removal of adhering matter: Part 2" test, which was done under severer conditions, the coated glass sheets of Examples 7 to 9 showed excellent results as in the "ease of removal of adhering matter: Part 1" test, but the coated glass sheets of Examples 1 to 6 showed further poorer antifouling properties than in the "ease of removal of adhering matter: Part 1" test. This reveals that the presence or absence of the contact angle-increasing film caused a large difference in effects under severer conditions.

As shown in Table 3, the coated glass sheets of Examples 14 to 19 with the porous layer having a structure different from that in the coated glass sheets of Examples 1 to 9 exhibited high durability by having a transmittance gain of 2.3% or more and also showing a small difference in average transmittance between before and after the high temperature humidity test.

INDUSTRIAL APPLICABILITY

The coated glass sheet of the present invention has superior light transmission properties as well as high durability. The coated glass sheet can therefore be used in various applications such as in vehicle panes, show-windows, and glass sheets for photoelectric conversion devices.

The invention claimed is:

1. A coated glass sheet comprising:
a glass sheet; and
a coating film provided on at least one principal surface of the glass sheet, the coating film comprising a dense layer and a porous layer, the dense layer being positioned between the porous layer and the glass sheet, and the porous layer comprising:
a matrix; and
isolated closed pores present within the porous layer, the isolated closed pores, when viewed in a cross-section along a thickness direction of the porous layer, including first closed pores that are approximately elliptical isolated pores and second closed pores each formed of two or more approximately elliptical pores connected to each other, wherein
the porous layer is substantially free of open pores open at a surface of the porous layer, and
a transmittance gain is 2.5% or more, the transmittance gain being calculated by subtracting an average transmittance of the glass sheet as determined by applying light having wavelengths of 380 to 1100 nm to the glass sheet in the absence of the coating film on a surface of the glass sheet from an average transmittance of the coated glass sheet as determined by applying light having the wavelengths to the coated glass sheet from a side on which the coating film lies.

2. The coated glass sheet according to claim 1, wherein the coating film consists of the dense layer and the porous layer.

3. The coated glass sheet according to claim 1, wherein the dense layer contains silica as a main component.

4. The coated glass sheet according to claim 3, wherein
the dense layer further contains at least one oxide selected from the group consisting of an oxide of aluminum, an oxide of zirconium, and an oxide of titanium and in the dense layer,
a content of the oxide of aluminum is, in terms of $Al_2O_3$ content, 10 mass % or less relative to the silica contained in the dense layer,
a content of the oxide of zirconium is, in terms of $ZrO_2$ content, 10 mass % or less relative to the silica contained in the dense layer, and
a content of the oxide of titanium is, in terms of $TiO_2$ content, 10 mass % or less relative to the silica contained in the dense layer.

5. The coated glass sheet according to claim 1, wherein the dense layer has a thickness of 10 to 40 nm.

6. The coated glass sheet according to claim 5, wherein the dense layer has a thickness of 10 to 20 nm.

7. The coated glass sheet according to claim 1, further comprising a contact angle-increasing film disposed on the coating film.

8. The coated glass sheet according to claim 1, wherein
the first closed pores and the approximately elliptical pores forming the second closed pores each have a major axis with a length of 30 to 80 nm and a minor axis with a length of 20 to 30 nm and are arranged so that the major axes extend along a surface of the coating film.

9. The coated glass sheet according to claim 1, wherein the porous layer has a thickness of 100 to 250 nm and a porosity of 10 to 40%.

10. The coated glass sheet according to claim 1, wherein, in the surface of the porous layer, a region other than openings of the open pores has an arithmetic average roughness Ra of 3 nm or less as determined over an evaluation length of 300 nm.

11. The coated glass sheet according to claim 1, wherein the matrix of the porous layer contains silica as a main component.

12. The coated glass sheet according to claim 11, wherein the silica is derived from a product of hydrolysis and condensation of a hydrolyzable silicon compound.

13. The coated glass sheet according to claim 12, wherein the hydrolyzable silicon compound is a silicon alkoxide.

14. The coated glass sheet according to claim 13, wherein the silicon alkoxide comprises a silicon alkoxide having one or two organic groups directly bonded to the silicon atom.

15. The coated glass sheet according to claim 14, wherein the organic group is a linear alkyl group having 1 to 5 carbon atoms.

16. The coated glass sheet according to claim 1, wherein the closed pores and the open pores are derived from fine particles that are contained as a pore forming agent in a coating liquid for forming the porous layer and that are lost by heat treatment at a temperature equal to or higher than a predetermined temperature.

17. The coated glass sheet according to claim 16, wherein the fine particles are fine organic polymer particles.

18. The coated glass sheet according to claim 17, wherein the fine organic polymer particles have an average particle diameter of 10 to 200 nm.

19. The coated glass sheet according to claim 16, wherein the coating liquid further contains a hydrolyzable silicon compound, and
a content of the fine particles is 12 to 38 parts by mass relative to 100 parts by mass of a product of hydrolysis and condensation of the hydrolyzable silicon compound in the coating liquid.

20. A coated glass sheet production method for producing the coated glass sheet according to claim 1, the method comprising the step of forming a coating film on one principal surface of a glass sheet, wherein the step includes:
(A) forming a wet film for dense layer formation using a coating liquid for dense layer formation, and drying the wet film for dense layer formation,
(B) forming a wet film for porous layer formation using a coating liquid for porous layer formation containing a matrix raw material and a pore forming agent, and drying the wet film for porous layer formation,
(C) calcining the dried film for dense layer formation, and
(D) calcining the dried film for porous layer formation.

21. The coated glass sheet production method according to claim 20, wherein the coating liquid for porous layer formation contains a hydrolyzable silicon compound as the matrix raw material, and the hydrolyzable silicon compound is hydrolyzed and condensed to form the matrix of the porous layer.

22. The coated glass sheet production method according to claim 21, wherein the hydrolyzable silicon compound is a silicon alkoxide.

23. The coated glass sheet production method according to claim 22, wherein the silicon alkoxide comprises a silicon alkoxide having one or two organic groups directly bonded to the silicon atom.

24. The coated glass sheet production method according to claim 23, wherein the organic group is a linear alkyl group having 1 to 5 carbon atoms.

25. The coated glass sheet production method according to claim 20, wherein the pore forming agent comprises fine particles that are lost by heat treatment at a temperature equal to or higher than a predetermined temperature.

26. The coated glass sheet production method according to claim 25, wherein the fine particles are fine organic polymer particles.

27. The coated glass sheet production method according to claim 26, wherein the fine organic polymer particles have an average particle diameter of 10 to 200 nm.

28. The coated glass sheet production method according to claim 20, wherein
the coating liquid for porous layer formation contains a hydrolyzable silicon compound as the matrix raw material and contains, as the pore forming agent, fine particles that are lost by heat treatment at a temperature equal to or higher than a predetermined temperature, and
a content of the fine particles is 12 to 38 parts by mass relative to 100 parts by mass of a product of hydrolysis and condensation of the hydrolyzable silicon compound in the coating liquid for porous layer formation.

29. A coated glass sheet comprising:
a glass sheet; and
a coating film provided on at least one principal surface of the glass sheet, the coating film comprising a dense layer and a porous layer, and the dense layer positioned between the porous layer and the glass sheet, wherein
the porous layer comprises fine silica particles with an average particle diameter of 50 to 200 nm, and a binder for the fine silica particles, and
a ratio between the fine silica particles and the binder (the fine silica particles:the binder) is 65:35 to 93:7 on a basis of mass.

30. The coated glass sheet according to claim 29, wherein the one principal surface of the glass sheet has surface asperities,
the surface asperities of the glass sheet have a mean spacing Sm of 0.4 mm or more and 2.5 mm or less, and an arithmetic average roughness Ra of 0.5 μm to 5 μm,
the coating film is formed on the surface asperities of the glass sheet,
in the porous layer, the fine silica particles are arranged in a single layer on peak portions of the surface asperities, and the fine silica particles are arranged to be built up to a thickness equivalent to that of at least three layers of the fine silica particles at bottom portions of the surface asperities, and
a transmittance gain is 1.5% or more, the transmittance gain being calculated by subtracting an average transmittance of the glass sheet as determined by applying light having wavelengths of 380 to 1100 nm to the glass sheet in the absence of the coating film on a surface of the glass sheet from an average transmittance of the coated glass sheet as determined by applying light having the wavelengths to the coated glass sheet from a side on which the coating film lies.

31. The coated glass sheet according to claim 29, wherein the one principal surface of the glass sheet has surface asperities,
the surface asperities of the glass sheet have a mean spacing Sm of 0.3 mm or more and 2.5 mm or less, and an arithmetic average roughness Ra of 0.3 μm to 5 μm,
the coating film is formed on the surface asperities of the glass sheet,
in the porous layer, the fine silica particles are uniformly arranged in a single layer on peak portions of the surface asperities in such a manner that a filling factor F defined by a formula below is 35 to 65%, and
a transmittance gain is 2.2% or more, the transmittance gain being calculated by subtracting an average transmittance of the glass sheet as determined by applying light having wavelengths of 380 to 1100 nm to the glass sheet in the absence of the coating film on a surface of the glass sheet from an average transmittance of the coated glass sheet as determined by applying light having the wavelengths to the coated glass sheet from a side on which the coating film lies, $F = A/B \times 100$ A: The number of the fine silica particles present in a square area with each side having a length 10 times the average particle diameter of the fine silica particles,
B: The number of spheres each having a diameter equal to the average particle diameter of the fine silica particles, assuming that the spheres are in closest-packing in the square area.

32. The coated glass sheet according to claim 31, wherein, in the porous layer, the fine silica particles are built up to a height equivalent to a height 1.5 to 2.1 times the average particle diameter of the fine silica particles at bottom portions of the surface asperities.

33. The coated glass sheet according to claim 29, wherein the surface asperities of the glass sheet have an average inclination angle θ of 0.05 to 1.0 degree.

34. The coated glass sheet according to claim 29, wherein the binder of the porous layer contains silica as a main component.

35. The coated glass sheet according to claim 34, wherein
- the binder of the porous layer further contains at least one oxide selected from the group consisting of an oxide of titanium and an oxide of zirconium, and
- in the binder of the porous layer,
- a content of the oxide of zirconium is, in terms of $ZrO_2$ content, 5 mass % or less relative to the silica contained in the binder, and
- a content of the oxide of titanium is, in terms of $TiO_2$ content, 5 mass % or less relative to the silica contained in the binder.

36. A coated glass sheet production method for producing the coated glass sheet according to claim 29, the method comprising the step of forming a coating film on one principal surface of a glass sheet, wherein the step includes:
  (a) forming a wet film for dense layer formation using a coating liquid for dense layer formation, and drying the wet film for dense layer formation,
  (b) forming a wet film for porous layer formation using a coating liquid for porous layer formation containing a binder raw material and fine silica particles, and drying the wet film for porous layer formation,
  (c) calcining the dried film for dense layer formation, and
  (d) calcining the dried film for porous layer formation.

* * * * *